(12) United States Patent
Pulla et al.

(10) Patent No.: US 8,792,709 B2
(45) Date of Patent: *Jul. 29, 2014

(54) TRANSPROJECTION OF GEOMETRY DATA

(75) Inventors: Sandeep Pulla, La Jolla, CA (US); Homer Eaton, Carlsbad, CA (US)

(73) Assignee: Hexagon Metrology, Inc., North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/529,945

(22) Filed: Jun. 21, 2012

(65) Prior Publication Data

US 2013/0063563 A1    Mar. 14, 2013

Related U.S. Application Data

(60) Continuation of application No. 12/753,720, filed on Apr. 2, 2010, now Pat. No. 8,229,208, which is a division of application No. 10/758,696, filed on Jan. 14, 2004, now Pat. No. 7,693,325.

(51) Int. Cl.
| | |
|---|---|
| *G06K 9/00* | (2006.01) |
| *G06T 15/00* | (2011.01) |
| *G01C 3/14* | (2006.01) |
| *G01B 11/26* | (2006.01) |
| *G01B 5/004* | (2006.01) |

(52) U.S. Cl.
USPC ............ 382/154; 382/152; 382/153; 348/46; 348/135; 345/419; 356/12; 356/138; 33/503

(58) Field of Classification Search
CPC ................. G06T 2207/30164; G06T 7/0075; G06T 15/00; G06K 9/00; H04N 13/0239; G01B 11/26; G01B 5/004; G01B 11/022

USPC .................. 382/152, 153, 154; 348/46, 135; 345/419; 356/12, 138; 33/503
See application file for complete search history.

(56) References Cited

U.S. PATENT DOCUMENTS

| | | | |
|---|---|---|---|
| 3,757,190 | A | 9/1973 | Shelley |
| 3,944,798 | A | 3/1976 | Eaton |

(Continued)

FOREIGN PATENT DOCUMENTS

| | | |
|---|---|---|
| DE | 4345091 | 7/1995 |
| DE | 10112977 | 11/2002 |

(Continued)

OTHER PUBLICATIONS

International Preliminary Report on Patentability for International Application PCT/US2004/039199, filed Nov. 23, 2004, report issued Jul. 17, 2006; Publication No. WO2005/071357.

(Continued)

*Primary Examiner* — Matthew Bella
*Assistant Examiner* — Jose M Torres
(74) *Attorney, Agent, or Firm* — Knobbe Martens Olson & Bear LLP

(57) ABSTRACT

Systems and methods for transprojection of geometry data acquired by a coordinate measuring machine (CMM). The CMM acquires geometry data corresponding to 3D coordinate measurements collected by a measuring probe that are transformed into scaled 2D data that is transprojected upon various digital object image views captured by a camera. The transprojection process can utilize stored image and coordinate information or perform live transprojection viewing capabilities in both still image and video modes.

19 Claims, 15 Drawing Sheets

(56) References Cited

U.S. PATENT DOCUMENTS

| | | |
|---|---|---|
| 4,313,263 A | 2/1982 | McMurtry |
| 4,382,215 A | 5/1983 | Barlow et al. |
| 4,388,758 A | 6/1983 | Ernst et al. |
| 4,492,036 A | 1/1985 | Beckwith |
| 4,496,279 A | 1/1985 | Langer |
| 4,593,470 A | 6/1986 | Davies |
| 4,606,696 A | 8/1986 | Slocum |
| 4,631,404 A | 12/1986 | Burkhardt et al. |
| 4,667,096 A | 5/1987 | Dangschat |
| 4,676,002 A | 6/1987 | Slocum |
| 4,703,443 A | 10/1987 | Moriyasu |
| 4,839,646 A | 6/1989 | Tyson |
| 4,857,926 A | 8/1989 | Neglia et al. |
| 4,888,877 A | 12/1989 | Enderle et al. |
| 4,932,136 A | 6/1990 | Schmitz et al. |
| 4,972,090 A | 11/1990 | Eaton |
| 5,050,608 A | 9/1991 | Watanabe et al. |
| 5,079,500 A | 1/1992 | Oswald |
| 5,084,981 A | 2/1992 | McMurtry et al. |
| 5,088,337 A | 2/1992 | Bennett |
| 5,148,377 A | 9/1992 | McDonald |
| 5,174,039 A | 12/1992 | Murai |
| 5,187,874 A | 2/1993 | Takahashi et al. |
| 5,189,797 A | 3/1993 | Granger |
| 5,251,156 A | 10/1993 | Heier et al. |
| 5,285,397 A | 2/1994 | Heier et al. |
| 5,293,107 A | 3/1994 | Akeel |
| 5,345,690 A | 9/1994 | McMurtry et al. |
| 5,396,712 A | 3/1995 | Herzog |
| 5,402,582 A | 4/1995 | Raab |
| 5,408,754 A | 4/1995 | Raab |
| 5,412,880 A | 5/1995 | Raab |
| 5,505,003 A | 4/1996 | Evans et al. |
| 5,510,977 A | 4/1996 | Raab |
| 5,521,847 A | 5/1996 | Ostrowski et al. |
| 5,526,576 A | 6/1996 | Fuchs et al. |
| 5,528,505 A | 6/1996 | Granger et al. |
| 5,611,147 A | 3/1997 | Raab |
| 5,615,489 A | 4/1997 | Breyer et al. |
| 5,757,499 A | 5/1998 | Eaton |
| 5,768,792 A | 6/1998 | Raab |
| 5,794,356 A | 8/1998 | Raab |
| 5,805,289 A | 9/1998 | Corby et al. |
| 5,813,128 A | 9/1998 | Bailey |
| 5,822,450 A | 10/1998 | Arakawa et al. |
| 5,829,148 A | 11/1998 | Eaton |
| 5,833,762 A | 11/1998 | Wanner et al. |
| 5,978,748 A | 11/1999 | Raab |
| 5,991,704 A | 11/1999 | Rekar et al. |
| 6,023,850 A | 2/2000 | Trapet |
| 6,073,056 A | 6/2000 | Gawronski et al. |
| 6,134,506 A | 10/2000 | Rosenberg et al. |
| 6,151,789 A | 11/2000 | Raab |
| 6,161,079 A | 12/2000 | Zink et al. |
| 6,166,811 A | 12/2000 | Long et al. |
| 6,219,928 B1 | 4/2001 | Raab et al. |
| 6,366,831 B1 | 4/2002 | Raab |
| 6,430,828 B1 | 8/2002 | Ulbrich |
| 6,487,896 B1 | 12/2002 | Dall'Aglio |
| 6,519,860 B1 | 2/2003 | Bieg et al. |
| 6,526,670 B1 | 3/2003 | Carli |
| 6,541,757 B2 | 4/2003 | Bieman et al. |
| 6,542,250 B1 | 4/2003 | Michaelis et al. |
| 6,598,306 B2 | 7/2003 | Eaton |
| 6,611,346 B2 | 8/2003 | Granger |
| 6,611,617 B1 | 8/2003 | Crampton |
| 6,618,496 B1 | 9/2003 | Tassakos et al. |
| 6,628,322 B1 * | 9/2003 | Cerruti .................. 348/141 |
| 6,668,466 B1 | 12/2003 | Bieg et al. |
| 6,701,268 B2 | 3/2004 | Noda et al. |
| 6,748,790 B2 | 6/2004 | Abbe |
| 6,759,648 B2 | 7/2004 | Baxter et al. |
| 6,760,977 B2 | 7/2004 | Jordil et al. |
| 6,817,108 B2 | 11/2004 | Eaton |
| 6,822,749 B1 | 11/2004 | Christoph |
| 6,892,465 B2 | 5/2005 | Raab et al. |
| 6,904,691 B2 | 6/2005 | Raab et al. |
| 6,925,722 B2 | 8/2005 | Raab et al. |
| 6,931,745 B2 | 8/2005 | Granger |
| 6,944,331 B2 | 9/2005 | Schmidt et al. |
| 6,952,882 B2 | 10/2005 | Raab et al. |
| 6,965,843 B2 | 11/2005 | Raab et al. |
| 6,984,236 B2 | 1/2006 | Raab |
| 6,988,322 B2 | 1/2006 | Raab et al. |
| 7,003,892 B2 | 2/2006 | Eaton et al. |
| 7,017,275 B2 | 3/2006 | Raab et al. |
| 7,043,847 B2 | 5/2006 | Raab et al. |
| 7,051,450 B2 | 5/2006 | Raab et al. |
| 7,069,664 B2 | 7/2006 | Raab et al. |
| 7,073,271 B2 | 7/2006 | Raab et al. |
| 7,092,484 B1 | 8/2006 | Jensen et al. |
| 7,096,077 B2 | 8/2006 | Price et al. |
| 7,152,456 B2 | 12/2006 | Eaton |
| 7,174,651 B2 | 2/2007 | Raab et al. |
| 7,246,030 B2 | 7/2007 | Raab et al. |
| 7,257,248 B2 | 8/2007 | Kokku et al. |
| 7,269,910 B2 | 9/2007 | Raab et al. |
| 7,296,364 B2 | 11/2007 | Seitz et al. |
| 7,296,979 B2 | 11/2007 | Raab et al. |
| 7,307,737 B1 | 12/2007 | Kling et al. |
| 7,313,264 B2 | 12/2007 | Crampton |
| 7,347,000 B2 | 3/2008 | Jordil et al. |
| 7,372,581 B2 | 5/2008 | Raab et al. |
| 7,395,606 B2 | 7/2008 | Crampton |
| 7,441,341 B2 | 10/2008 | Eaton |
| 7,525,276 B2 | 4/2009 | Eaton |
| 7,546,689 B2 | 6/2009 | Ferrari et al. |
| 7,568,293 B2 | 8/2009 | Ferrari |
| 7,578,069 B2 | 8/2009 | Eaton |
| D599,226 S | 9/2009 | Gerent et al. |
| 7,624,510 B2 | 12/2009 | Ferrari |
| 7,640,674 B2 | 1/2010 | Ferrari et al. |
| 7,676,945 B2 | 3/2010 | Prestidge et al. |
| 7,693,325 B2 | 4/2010 | Pulla et al. |
| 7,712,224 B2 | 5/2010 | Hicks |
| 7,743,524 B2 | 6/2010 | Eaton et al. |
| 7,774,949 B2 | 8/2010 | Ferrari |
| 7,779,548 B2 | 8/2010 | Ferrari |
| 7,784,194 B2 | 8/2010 | Raab et al. |
| 7,805,854 B2 | 10/2010 | Eaton |
| 7,908,757 B2 | 3/2011 | Ferrari |
| 7,984,558 B2 | 7/2011 | Ferrari |
| D643,319 S | 8/2011 | Ferrari et al. |
| 8,001,697 B2 | 8/2011 | Danielson et al. |
| 8,015,721 B2 | 9/2011 | Eaton et al. |
| 8,082,673 B2 | 12/2011 | Desforges et al. |
| 8,099,877 B2 | 1/2012 | Champ |
| 8,104,189 B2 | 1/2012 | Tait |
| 8,112,896 B2 | 2/2012 | Ferrari et al. |
| 8,122,610 B2 | 2/2012 | Tait et al. |
| 8,123,350 B2 | 2/2012 | Cannell et al. |
| 8,127,458 B1 | 3/2012 | Ferrari |
| 8,145,446 B2 | 3/2012 | Atwell et al. |
| 8,151,477 B2 | 4/2012 | Tait |
| 8,176,646 B2 | 5/2012 | Ferrari |
| 8,201,341 B2 | 6/2012 | Ferrari |
| 8,220,173 B2 | 7/2012 | Tait |
| 8,229,208 B2 | 7/2012 | Pulla et al. |
| 8,327,555 B2 | 12/2012 | Champ |
| 8,336,220 B2 | 12/2012 | Eaton et al. |
| 8,402,669 B2 | 3/2013 | Ferrari et al. |
| 8,497,901 B2 | 7/2013 | Pettersson |
| 2002/0117611 A1 | 8/2002 | Kley |
| 2003/0076991 A1 | 4/2003 | Nishide |
| 2004/0083830 A1 | 5/2004 | Nashiki et al. |
| 2004/0228517 A1 | 11/2004 | Massen |
| 2007/0063500 A1 | 3/2007 | Eaton |
| 2008/0016711 A1 | 1/2008 | Baebler |
| 2011/0088271 A1 | 4/2011 | Bridges |
| 2011/0112786 A1 | 5/2011 | Desforges et al. |
| 2011/0175745 A1 | 7/2011 | Atwell et al. |
| 2011/0213247 A1 | 9/2011 | Shammas |

(56) References Cited

U.S. PATENT DOCUMENTS

FOREIGN PATENT DOCUMENTS

| | | |
|---|---|---|
| EP | 0522610 | 1/1993 |
| FR | 2740546 | 4/1997 |
| GB | 2274526 | 7/1994 |
| JP | 4/032393 | 2/1992 |
| JP | 404057690 | 2/1992 |
| JP | 05/031685 | 2/1993 |
| JP | 2003/021133 | 1/2003 |
| JP | 2003/175484 | 6/2003 |
| JP | 2003/275484 | 9/2003 |
| JP | 2006/214559 | 8/2006 |
| WO | WO 98/08050 | 2/1998 |
| WO | WO 2008/080142 | 7/2008 |

OTHER PUBLICATIONS

Shen et al., "Multiple-Sensor Integration for Rapid and High-Precision Coordinate Metrology", IEEE/ASME Transactions on Mechatronics, vol. 5 No. 2, Jun. 2000, pp. 110-121.

* cited by examiner

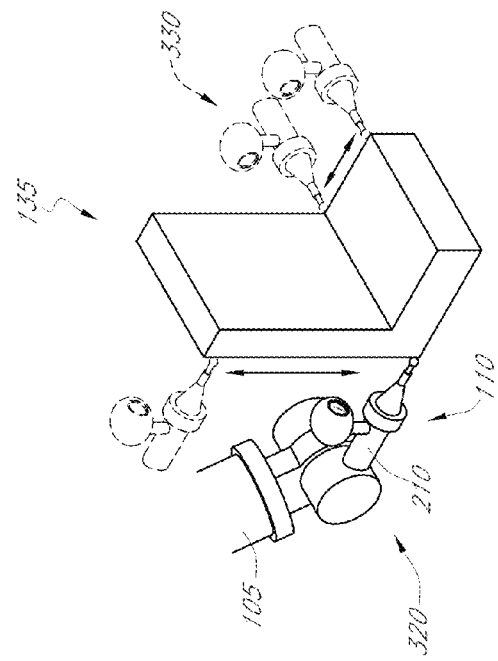
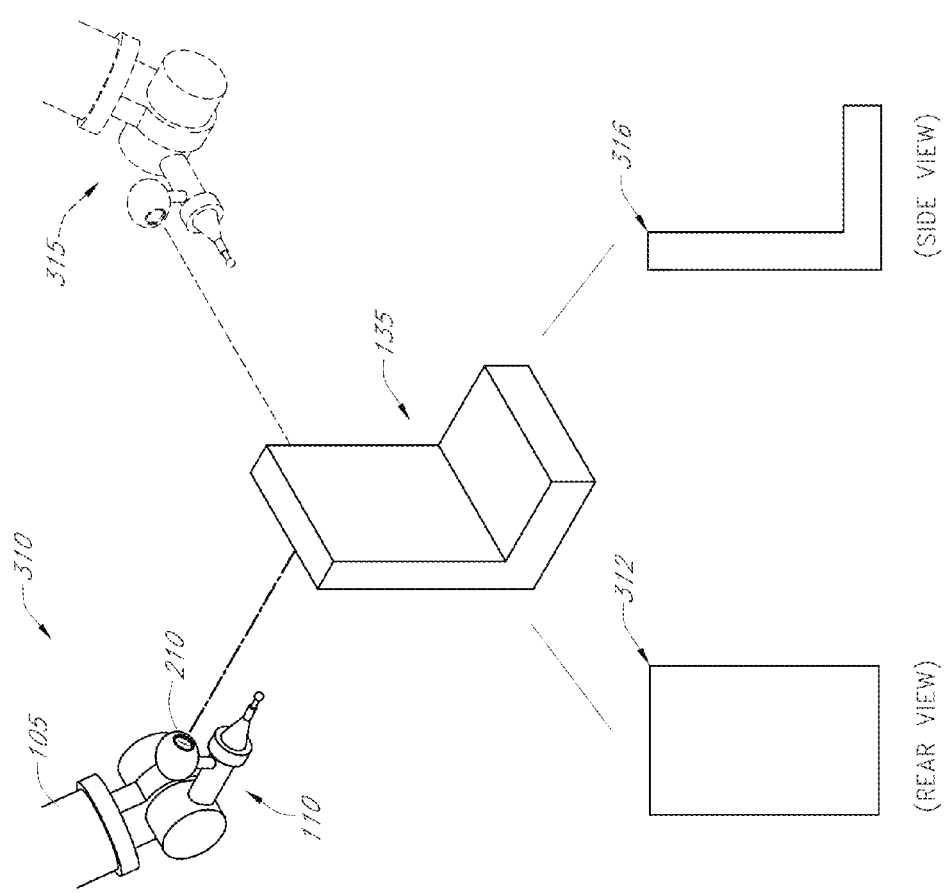
FIG. 3B
FIG. 3A

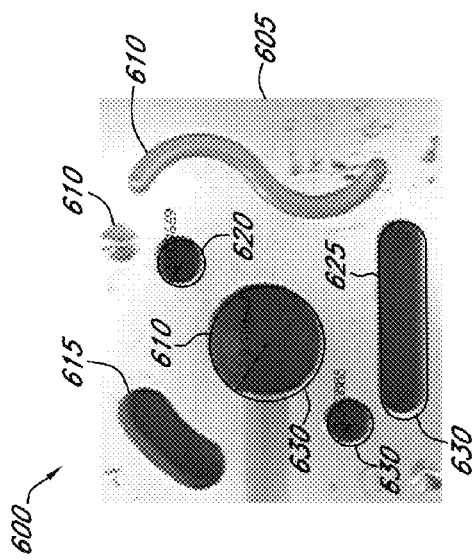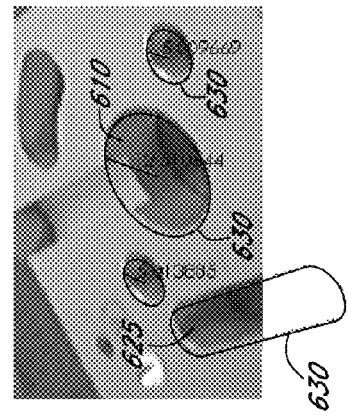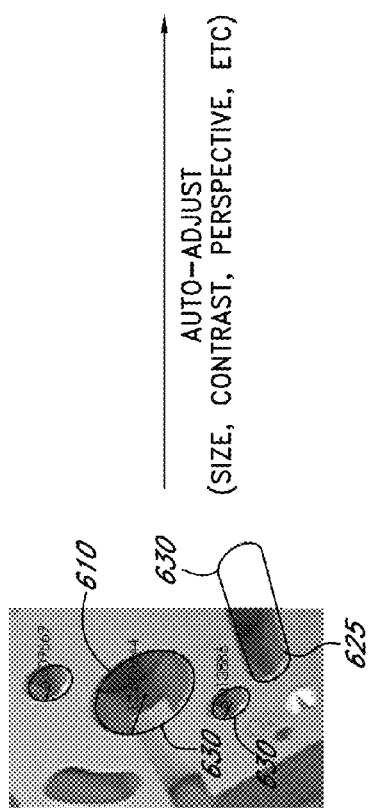
FIG. 6A
FIG. 6B
FIG. 6C
AUTO-ADJUST (SIZE, CONTRAST, PERSPECTIVE, ETC)

TRANSPROJECTION OF GEOMETRY DATA

CROSS-REFERENCE TO RELATED APPLICATIONS

This application is a continuation application of U.S. patent application Ser. No. 12/753,720, filed 2 Apr. 2010, which is a divisional application of U.S. patent application Ser. No. 10/758,696, filed 14 Jan. 2004, and entitled "TRANSPROJECTION OF GEOMETRY DATA" (now U.S. Pat. No. 7,693,325), which is incorporated herein by reference in its entirety. This application also incorporates by reference in its entirety the U.S. patent application Ser. No. 10/758,697, filed 14 Jan. 2004, and entitled "AUTOMATED ROBOTIC MEASURING SYSTEM" (now U.S. Pat. No. 7,152,456).

BACKGROUND OF THE INVENTION

1. Field of the Invention

The present teachings generally relate to rectilinear measuring systems and articulated arm coordinate measuring machines and more particularly to a system and methods for transprojecting geometry data.

2. Description of the Related Art

Rectilinear measuring systems, also referred to as coordinate measuring machines (CMM's) and articulated arm measuring machines including portable coordinate measuring machines (PCMM's) have been described for generating geometry information from various objects and areas. In general, these devices capture the structural characteristics of an object for use in electronic rendering and duplication. One example of a conventional apparatus used for coordinate data acquisition comprises a support and a moveable arm made up of hinged segments to which a contact-sensitive probe or remote scanning device is attached. Geometry information or three-dimensional coordinate data characterizing the shape, features, and size of the object may be acquired by tracing or scanning along the object's surface and contours. Probe or scanning device movement is typically tracked relative to a reference coordinate system resulting in a collection of data points and information that may be used to develop an accurate electronic rendering of the object. In conventional implementations, the acquired geometry information is processed by a computer capable of making use of the information to model the surface contours and dimensions of the object.

One limitation found in many conventional instruments is that they are generally intended to operate in an environment wherein geometry information captured by the probe or remote scanning device forms an electronic representation of the object without the benefit of photographic dimensional details scaled to the same coordinate system as the geometry information. Providing the ability to evaluate and analyze object coordinate measurements overlaid upon appropriate views and perspectives of a photographic representation of the object provides numerous advantages over conventional rendering approaches. In particular, visual rendering in this manner aids in giving context, dimension, and realism to the geometry information, as well as, providing a convenient means for review and validation.

Systems have been described which provide a limited coupled optical and mechanical object acquisition environment including, for example, U.S. Pat. Nos. 4,908,951 and 5,615,489. These apparatuses are generally directed towards systems for remotely monitoring a probe contact region and surrounding area in a two dimensional context and fail to adequately provide the ability to superimpose or transproject scaled 3D geometry or coordinate data upon 2D images that can be made to accurately reflect the various object details in different orientations and rotations. Coordinate transprojection in such a manner may add significantly to the functionality and potential utility of coordinate acquisition devices contributing to improved design, engineering, and analysis capabilities.

However desirable, accurate coupling of digital object image information to coordinate data presents a number of difficulties in order to capture the characteristics and benefits of each in combination. In particular, calibration of the measuring environment both from the perspective of an object image acquisition device (providing two-dimensional data) as well as from the perspective of the coordinate acquisition probe or remote scanning device (providing three-dimensional data) using a singular coordinate system is generally necessary to allow presentation of both types of information in an integrated manner. Furthermore, it may be desirable to implement a perspective switching or image panning functionality in conjunction with the display system while preserving coordinate scaling accuracy. In these and other regards, conventional instruments and methods fail to adequately provide flexible transprojection capabilities to model 3D coordinate data in combination with 2D photographic images.

From the forgoing it will be appreciated that there is a need for an object image transprojection system that is capable of not only providing object monitoring capabilities but also a means by which digital images captured from the object can be accurately overlaid with scaled coordinate or geometry information. Furthermore, there is a need for a system which allows this data to be rapidly visualized while preserving the accuracy and precision of the measurements.

SUMMARY OF THE INVENTION

The present teachings relate to a system and methods for transprojection of geometry information used in conjunction with a coordinate measuring machine (CMM). The CMM comprises a positioning arm having a measuring probe coupled to an image acquisition device or camera. Images of the object to be inspected by the CMM are electronically captured and 3D coordinate measurements collected by the probe are transformed into 2D data that can be overlaid on various digital object image views. In various embodiments, the transprojection process describes a means for coupling the coordinate systems for the image acquisition device and the measuring probe. In one aspect, coordinate system coupling is accomplished by first applying a calibration procedure which establishes a reference coordinate system in which probe movement can be discerned. Reference axes may be determined using a two dimensional target area (e.g. target board) having known dimensions from which a third axis may be extrapolated on the basis of a calculated plane normal from the target area. Digital images acquired by the camera characterizing to the target area are further calibrated in such a manner so that an axis and orientation of the camera image can be ascertained with reference to the target area.

In certain embodiments, calibration of the camera with respect to the target area is accomplished through the application of empirical correction factors to the coordinate data that model various camera characteristics including, for example: angle, focal length, distortion, offset/scaling, and camera position. Use of these corrections factors provides a means to scale the coordinate data to the digital images by establishing a coordinate system in which both the digital image data and the probe coordinate data may be accurately rendered.

In one aspect, the transprojection process uses the aforementioned correction factors to transform the 3D coordinate data into scaled 2D data that may be overlaid upon the digital image to preserve accurate scaling and perspective. A plurality of digital images may be used to visualize the object from different angles, distances, and perspectives with the transprojected data overlaid thereon. In another aspect, full-motion video images may be captured and transprojected with coordinate data.

Another capability of the system is to ascertain available digital images of the object and select appropriate views to display to the user dependent upon the positioning of the probe. Thus, as the probe is moved from one position to another within the target area, the system may be configured to identify and display an appropriate view of the object along with corresponding coordinate data transprojected in the selected view. The system may further be configured to display coordinate data and, object imaging in "real-time" using either static images (capable of auto-switching from one perspective to another) or full-motion video.

In various embodiments the invention comprises a system for coordinate visualization. This system further comprises: a measuring system for acquiring three dimensional coordinate data from a target location on an object; an imaging member that generates an image of at least a portion of said object from a vantage point whose three dimensional location is known; and a processor which receives said three dimensional coordinate data, said image and said three dimensional location, said processor producing image data overlaying a visible marker at said target location on said image.

In another embodiment, the invention comprises a method for displaying geometry and imaging information. The method further comprises the steps of: (a) acquiring at least one image of at least a portion of a target area; (b) mapping points of the image to corresponding points in the target area; (c) acquiring geometry information for an object in the target area; (d) performing a transformation operation to map the geometry information of the object to the image; and (e) displaying the image overlaid with the geometry information.

Additionally the calibration parameter may be identified by the steps of: (a) designating at least one calibration target having a known positional relationship to the target area; (b) acquiring at least one image containing a representation of the at least one calibration target; (c) applying a target detection operation to discern the representation of the at least one calibration target within the image; (d) associating the target's known positional relationship to the target area with the target coordinate system; (e) associating the representation of the at least one calibration target with the image coordinate system; and (f) developing the calibration parameter to relate the target coordinate system and image coordinate system on the basis of the target and its representation in the two coordinate systems.

In still another embodiment the invention comprises a system for coordinate acquisition and visualization. This system further comprises: an arm member having a probe member attached thereto, the arm member positioned with respect to a target area such that the probe member acquires coordinate information from the target area; an imaging member configured to generate at least one image of at least a portion of the target area; and a controller configured to receive the coordinate information and the at least one image whereupon the controller adjusts and overlays the coordinate information upon the at least one image to reflect the position and orientation of the coordinate information in the context of the image.

BRIEF DESCRIPTION OF THE DRAWINGS

FIG. 3A illustrates a schematic diagram of an image acquisition mode of the sensing and imaging member used in the transprojection process.

FIG. 3B illustrates a schematic diagram of a coordinate data acquisition mode of the sensing and imaging member used in the transprojection process.

FIGS. 6A-1 illustrate the transprojection of exemplary coordinate data upon object images.

DETAILED DESCRIPTION OF THE PREFERRED EMBODIMENT

The following detailed description presents various descriptions of certain embodiments of the present teachings described herein. However, the inventive scope of the present teachings can be embodied in a multiplicity of different ways as defined and covered by the claims. In this description, reference is made to the drawings wherein like parts are designated with like numerals throughout.

In the description, the term transprojection generally defines the process of associating coordinate or geometry data with image data or information. In one aspect, the coordinate data is based on a 3D coordinate system and the image data is based on a 2D coordinate system, alternatively, both the coordinate data and the image data may be 3D in nature and utilize the same or different coordinate systems. In still other embodiments, both the coordinate data and the image data may be based on 2D coordinate systems.

The transprojection processes define a means by which to merge or associate the two coordinate systems of the coordinate data and the image data into a singular coordinate system that accurately reflects the position and alignment of the coordinate data within the image data. Transprojection may also be generally defined as the overlaying, superimposing, or inserting of the coordinate data onto or into the image data such that the two types of data may be accurately represented and viewed with respect to one another. Transprojection of the two types of data may be accomplished by scaling operations wherein information defined in the context of a first coordinate system is accurately translated or transformed into a second coordinate system. Thus, in certain embodiments, transprojection may comprise performing operations which transform the 3D coordinate data into a 2D coordinate data representation that is scaled to the coordinate system defined by the image data. The aforementioned operations permit the simultaneous viewing of the coordinate data and image data within substantially the same coordinate system as will be described in greater detail hereinbelow.

While various embodiments of the present teachings are directed towards coordinate acquisition and image transprojection described in the context of object rendering using a CMM device; one skilled in the technology will appreciate that the systems and methods described herein may similarly be configured to implement other types of transprojection applications in addition to CMM coordinate processing. As the CMM transprojection system is presented as an illustrative embodiment, the scope of the present teachings is not limited exclusively to this embodiment, but rather includes additional implementations as well.

Figure 1:
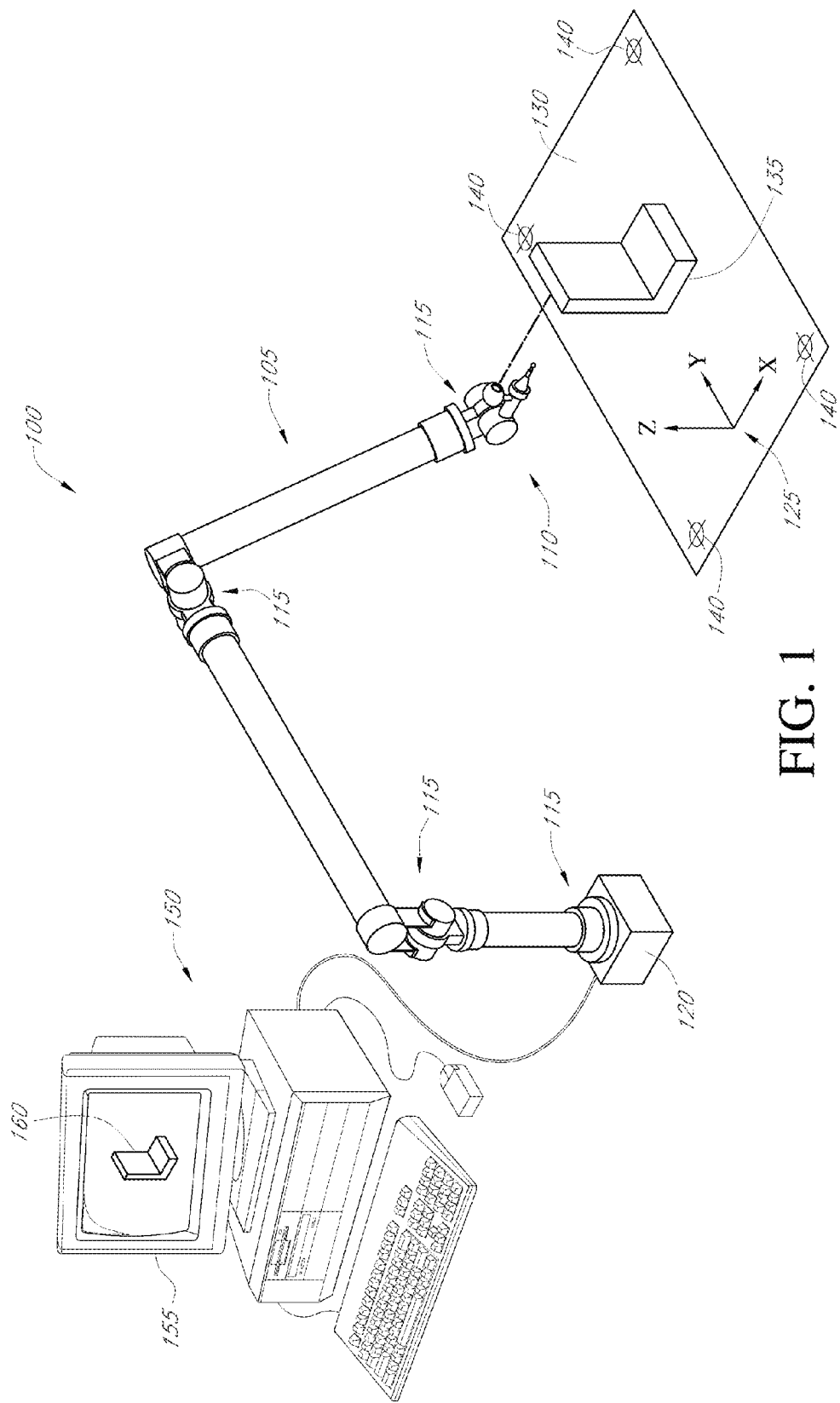
FIG. 1 illustrates a schematic diagram of the components of the transprojection system.

FIG. 1 illustrates the principle components of an exemplary transprojection system 100 according to the present teachings. The system 100 comprises a portable CMM apparatus (PCMM) having an articulated arm 105 upon which a sensing and imaging member 110 is attached. The arm 105 of the PCMM is typically used to align the sensing and imaging member 110 in various spatial orientations through a plurality of rotational transfer housings 115 each of which provide one or more degrees of freedom to the arm 105 to allow positioning of the sensing and imaging member 110 in three dimensional space.

In one aspect, the arm 105 may be secured to a support surface at its base 120 and may be manually or automatically operated to adjust the position of the arm 105 thereby orienting the sensing and imaging member 110 in desired positions within a target area 125. The target area 125 may further be defined in part by a target board 130 in 2D coordinate space defined by (x/y) axis along with a normal axis (z-axis) extending from the target board 130. Thus each point within the target area 125 may be represented as 3D coordinates (defined in relation to the x/y/z axis). An object 135 for which geometry information is to be acquired may further occupy at least a portion of the target area 125, the surfaces of which may be inspected and visualized by, the sensing and imaging member 110 as will be described in greater detail hereinbelow.

The target board 130 further comprises a plurality of target delineators 140 positioned about the target area 125 and typically arranged upon the target board 130. The targets 140 define positional reference points within the target area 125 and provide a means for calibrating the sensing and imaging member 110. As shown by way of illustration, target delineators 140 may be positioned near the outer periphery of the target board 130 and generally define points or regions within the 2D plane of the target board 130. It will be appreciated, however, that the targets 140 need not necessarily be positioned exclusively in this manner, and a greater or fewer number of targets 140 may be positioned in various positions with respect to the target board 130 and target area 125 to achieve other desired positional arrangements. Furthermore, the targets 140 need not necessarily be discretely constructed and may be identified as an integral feature of the target board 130 and/or target area 125. For example, the targets 140 may comprise the edges or corners of the target board 130 itself or using known or empirically determined points within the target area 125. In general, the targets 140 serve for aligning and scaling 3D coordinate data acquired from the target area 125 with 2D image data upon which transprojection of processed coordinate data takes place. Further details of the use of the target 140 in conjunction with the probe and imaging member will be described in greater detail hereinbelow.

The sensing and imaging member 110 is configured to transmit data to a computer/controller station 150 which comprises an output display 155 and processor (not shown) running software that is configured to receive the data from the sensing and imaging member 110 and processes the data in a number of ways. In one aspect, the data is used to generate a transprojection rendering 160 comprising both digital image information and coordinate or geometry data characterizing the object 135 which has been positioned within the target area 125. In various embodiments, the coordinate data is desirably overlaid upon object images in a manner wherein the image and the coordinate data are scaled and represented within a singular coordinate system such that the coordinate data accurately represents the features within the images. Various additional capabilities of the software and transprojection system will be described in greater detail hereinbelow.

Figure 2:
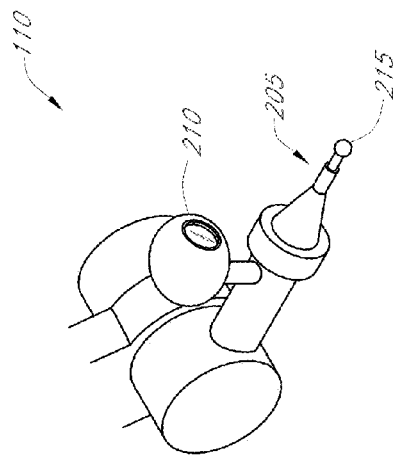
FIG. 2 illustrates 2 a schematic diagram of the sensing and imaging member comprising a probe and camera.

FIG. 2 illustrates one embodiment of the sensing and imaging member 110. This component 110 comprises a probe 205 and a camera or image acquisition device 210. The attachment of this component 110 to the arm 105 allows for positioning at various angles and orientations in three dimensional space wherein the camera 210 is used to capture images of the target area 125 and objects 135 contained therein. Likewise, the probe 205 positioning via the arm 105 provides a means to acquire coordinate data from the object 135.

In various embodiments, the probe 205 comprises a contact sensitive member 215 configured to engage the surfaces of the object 135 and generate coordinate data on the basis of probe contact as directed through the arm 105. Alternatively, the probe 205 may comprise a coordinate detection component that does not necessarily require direct contact with the object 135 to acquire coordinate data. In one exemplary application, a laser coordinate detection device may be used in lieu of the probe 205 to obtain coordinate data remotely without direct object contact. In the present teachings, acquisition of coordinate data is generally described in the context of the contact sensitive member 215; however it will be appreciated that the system and methods described herein may be readily adapted to numerous different configurations to achieve other manners of coordinate data transprojection.

As shown in the illustration, and in various embodiments, the camera 210 is positioned with respect to the probe 205 in such a manner so that images captured by the camera 210 do not necessarily include the probe 205 in the field of view. When so positioned, the camera 210 is able to acquire substantially unobstructed images of the target area 125 and the object 135. This feature of the CMM system 100 is distinguishable from that of conventional devices which may employ a camera for the purposes of monitoring probe position and contact with respect to an object. In these systems, the camera generally serves as a device for providing remote monitoring during the coordinate acquisition. Unlike conventional systems, the sensing and imaging member 110 serves a multi-fold purpose used for calibrating the target area 125, imaging the object 135 from various perspectives or views, and acquiring coordinate data from the object which is scaled to the same coordinate system as the object images to provide a means for transprojection of the geometry data onto the object image.

As will be described in greater detail hereinbelow, the camera 210 and probe 205 location or position in three dimensional space can be determined through a calibration process using a known relationship between the camera position and the probe position. By ascertaining the coordinates of either the probe 205 or the camera 210, the coordinate systems for both components can be determined with respect to one another. Thus, the 3D coordinate information generated by the probe 205 can be associated and transprojected onto the 2D images acquired by the camera 210 through a series of calibration and scaling operations. The resulting association of these data types allows accurate rendering of objects in the target area 125 upon which geometry data may be transprojected in both live and simulated modes.

While the transprojection processes are described throughout principally in the context of visualization of coordinate information using 2D images, it will be appreciated that the present teachings may also be applied to 3D image transprojection. For example, the camera 210 used to acquire object images may generate 3D stereographic images or other 3D imagings. In certain embodiments, the 3D imagings may be acquired using 2 or more cameras, for example, to acquire substantially simultaneous stereographic images or red/green images that may create a 3D image when appropriately viewed.

These aforementioned imagings may be used in a similar manner as the 2D images wherein the 3D coordinate information is transprojected onto the 3D imagings following the calibration and scaling operations. These and other transprojection processes wherein calibrated and scaled coordinate information is superimposed or viewed over acquired image data should be considered but other embodiments of the present teachings.

It will be appreciated that the configuration of the sensing and imaging member 110 with the camera 210 and probe 205 oriented as shown represents but one of many possible embodiments. In certain embodiments, the camera 210 may be positioned elsewhere on the arm 105 or alternately may occupy another location entirely. Additionally, the sensing and imaging member 110 may comprise an integrated imaging/contact sensing component as opposed to discrete components. Furthermore, the probe position may be such that images acquired by the camera 210 include the probe 205 in the field of few. In another aspect, the known positional relationship between the camera 210 and the probe 205 may be used to calculate and render the probe position within a selected object image thereby providing an identifier or reference for purposes of remote viewing and data acquisition (such as might be used in conjunction with an automated or motor-driven CMM device). In each of the aforementioned embodiments, the transprojection system 100 is configured to derive a relationship between the coordinate system of the probe 205 with that of the camera 210 such that the geometry data acquired by the probe 205 is scaled and converted into appropriate data that is overlaid or transprojected upon the image data. Typically, the aforementioned transprojection processes involve capturing 3D geometry data from the probe 205 and transforming this data into a 2D representation that is scaled to a substantially similar 2D coordinate system as used to represent the acquired camera image.

FIGS. 3 A-8 illustrate two principle modes of acquisition used by the sensing and imaging member 110 when performing the transprojection process. As shown in FIG. 3A, a first operational mode comprises image acquisition wherein the camera 210 is used to capture images of the object 135. During image acquisition, the camera 210 may be positioned via the arm 105 to acquire images of the object 135 from different orientations and perspectives 310, 315 to desirably facilitate visualization of the object features from multiple views. Object image acquisition may further comprise acquiring images at different distances and angles from the object thus providing the ability to "zoom" in and out to increase or decrease the level of detail in each image. Taken together the acquired images form a collection of "snapshots" which can be remotely viewed on the display 155 of the computer I controller 150 by a user.

In various embodiments, the transprojection system 100 maintains information that associates each image with a particular coordinate or set of coordinates used to identify appropriate images to be displayed on the basis of a desired view or perspective. For example, images may be selected for display on the basis of the probe position relative to the object such that if the sensing and imaging member 110 is positioned as indicated in perspective 310 an image generally corresponding to the view of the object from this perspective (rear view 312), may be displayed to the user. Likewise, when the sensing and imaging member 110 is positioned as indicated in perspective 315 an image generally corresponding to the view of the object from this perspective (side view 316) may be displayed to the user. Thus, the ability to position the probe and imaging member 110 via the arm 105 allows a comprehensive set of images of the object 135 from different perspectives to be obtained.

As will be described in greater detail hereinbelow, the association of object images with coordinate data advantageously imparts an ability to determine the appropriate captured image to display depending upon the desired object 135 perspective to be visualized. Captured images may be displayed to the user on the basis of the desired perspective and images retrieved from a storage area and displayed, switching between object views to maintain the desired perspective. In one aspect, the aforementioned functionality provides a means to view the three dimensional details of the object 135 by switching and displaying images having different perspectives in a manner analogous to how an individual might visually inspect an object from differing perspectives. Additionally, the object viewing functionality may take the form of a "video" rendering mode wherein the object 135 may be viewed as a series of frames which appear to fluidly transition from one perspective to another.

FIG. 38 illustrates a second operational mode of the transprojection system 100, wherein the sensing and imaging member 110 is directed to acquire coordinate data and telemetry information from the object 135. Coordinate acquisition typically involves inspecting desired surfaces and object features using the probe 205 so as to acquire geometry measurements including distances, angles, contours, shapes, etc. The data acquired by the probe 205 is collected with reference to a known 3D coordinate system such that the structural characteristics of the object may be stored and accurately rendered by the computer/controller 150.

In one aspect, determination of the reference coordinate system is based upon the CMM apparatus and characteristics wherein the actual probe position is ascertainable for substantially any point within the target area 125. Calibration of the probe 205 with respect to the target area 125 may proceed in any of a number of different manners including by way of methods described for conventional CMM devices.

During coordinate acquisition, the probe 205 may be positioned in various perspectives 320, 330 in a manner similar to that of the image acquisition mode. Furthermore, image acquisition may take place independently of coordinate acquisition or alternatively these processes may be coupled wherein both coordinate data and images are acquired during the same intervals. Transprojection of coordinate data may further occur in a "live" manner by acquiring geometry information and substantially simultaneously displaying this information overlaid onto the appropriate image(s) viewed on the display 155 of the computer 150. This functionality is useful in that the user may visualize the coordinate data acquisition process and image transprojection as it takes place rather than being limited to review and rendering of the data after it has been obtained and stored in the system 100. In various embodiments, live image transprojection is particularly useful as it provides the user with important feedback as to the quality and progress of the data acquisition. Furthermore, live image transprojection may be combined with the ability to review previous transprojection details in the same or different perspectives to improve the flexibility of the system 100.

Figure 4:
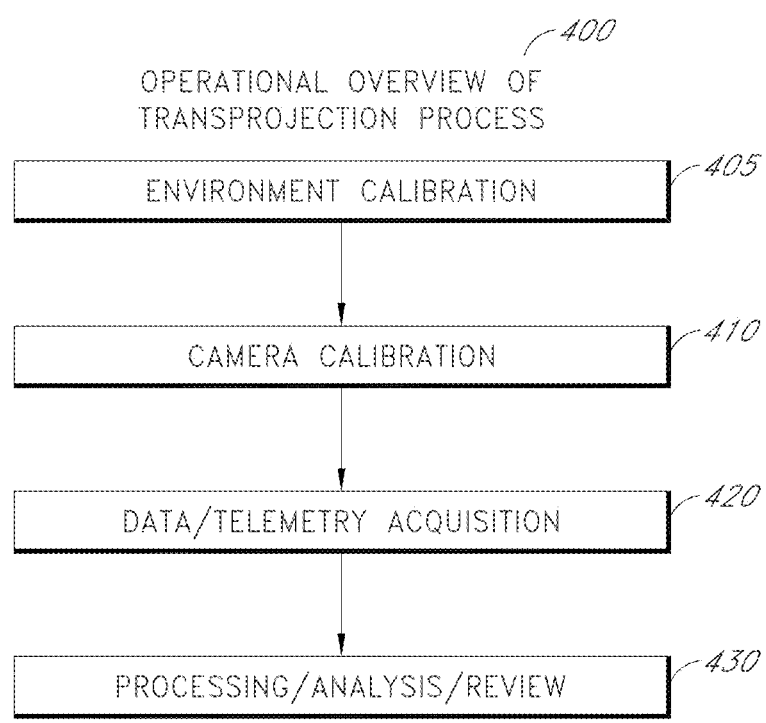
FIG. 4 illustrates a flow diagram depicting an overview of the transprojection operations.

FIG. 4 illustrates an operational overview of a method 400 for transprojection according to the present teachings. The method 400 commences in state 405 wherein environment calibration takes place. In various embodiments, this process 405 refers to the activities/calculations that identify and calibrate the CMM apparatus with respect to the target board 130 and the 3D target area 125 surrounding the 2D target board 130. Environmental calibration 405 further associates an appropriate 3D coordinate system with the probe 205 such that for any position the probe 205 occupies in the target area 125 a set of 3D coordinates can be identified (e.g. x/y/z coordinates) which define the relative position of the probe 205 with respect to the target area 125.

In various embodiments, the probe and imaging device 110 is affixed to the arm 105 and is configured to acquire 3D positional coordinates which are transmitted to the computer 150 such that the location of the-probe and imaging device 110 is identified by association with the selected coordinate system. The coordinate system information and associated data may relate to both calibration of the probe 205 and the camera 210 such that the information from each may be applied to generating transprojected coordinate data upon acquired images.' Once environmental calibration 405 is complete, the position of the probe and imaging device 110 in relation to the aforementioned regions 125, 130 can be accurately ascertained and the probe coordinates related to the camera image coordinates as will be described in greater detail hereinbelow.

In state 410, calibration of the imaging device 210 takes place and is directed towards calibrating images generated by the camera component 210 such that they may be accurately related to the coordinate geometry of the target board 130. In various embodiments, camera' calibration 410 desirably performs a series of operations that provide a means to associate the electronically rendered dimensions and perspectives for images acquired using the imaging device 210 to the actual dimensions and position of the target board 130 and target area 125 (including objects 135 and features contained therein). These operations 410 are further directed towards accurately scaling the image features so that they may be related in dimension, position, and perspective to the target board 130. As will be described in greater detail hereinbelow, calibration in the aforementioned manner takes into account various physical and operational characteristics of the camera 210 as well as its positional relationship to the probe 205. The resulting calibration parameters define a series of—transformation operations that may be used to relate 2D image data to 3D geometry data. In various embodiments, these calibration operations further take into account or simulate camera parameters which may include for example; image acquisition angle, image focal length, various distortion parameters, offset and scaling parameters, and camera position.

Once the environment has been suitably calibrated in state 410, acquisition of coordinate data and geometry information may proceed in state 420 wherein data for a selected object 135 and its features or structural characteristics is obtained. This information may further be stored in the computer 150 for subsequent retrieval and processing to thereby allow data transprojection operations to be performed and visualized on the display 155 as desired. In various embodiments, the data capture and transprojection system 100 provides certain desirable features directed towards processing, analysis, and review of results (state 430) which advantageously improve the functional capabilities of the system 100 over conventional CMM's. In one aspect, these capabilities are made possible as a result of the accurate coupling of the coordinate data with the image data such that both may be related to "virtually" model the characteristics of the object under investigation.

Figure 5:
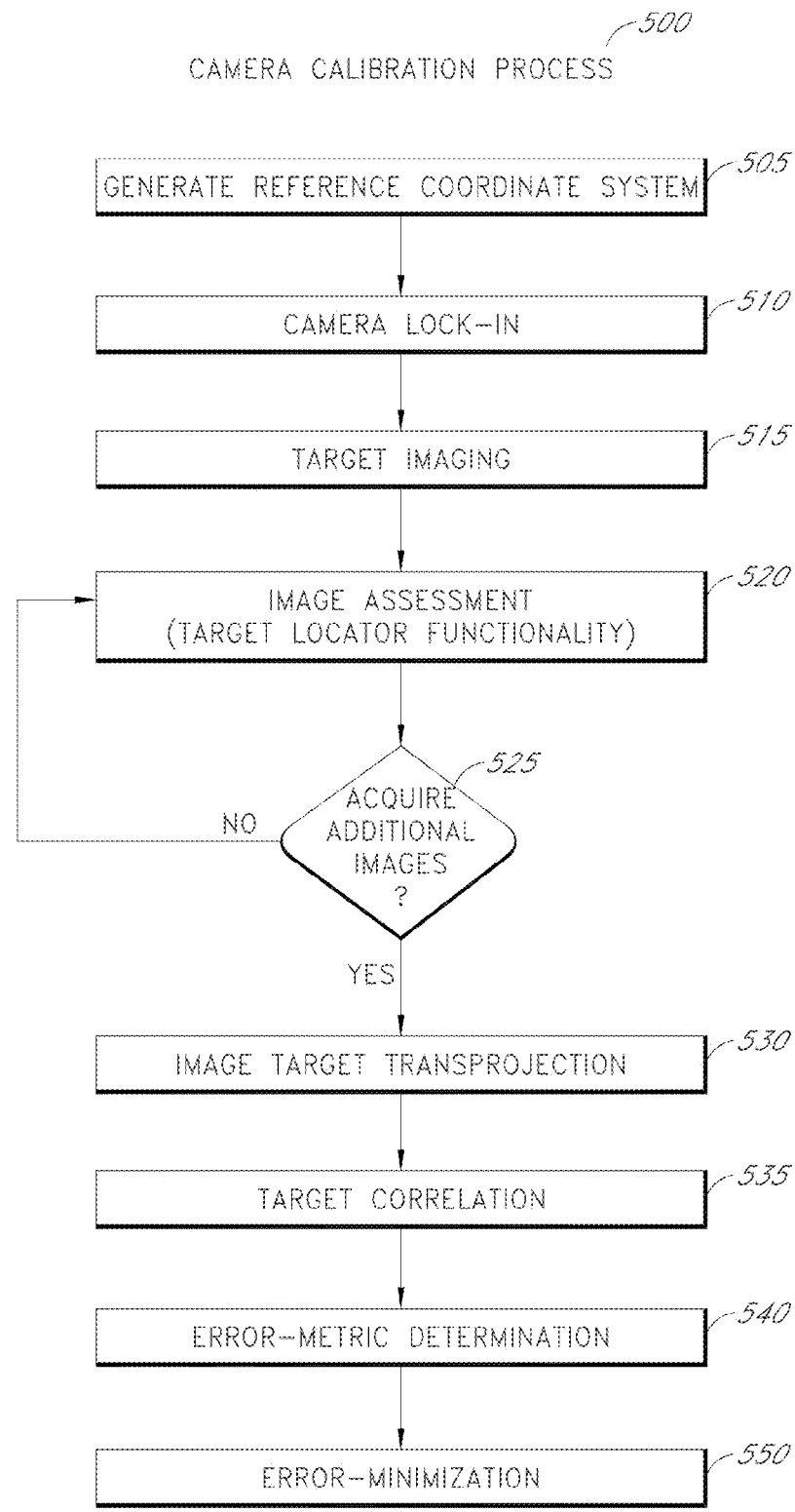
FIG. 5 illustrates a flow diagram of the calibration operations associated with readying the system for routine transprojection operations.

FIG. 5 illustrates a detailed flow diagram of a series of calibration operations that may be used to ready the transprojection system 100 for routine operations. Calibration according to this method 500 commences in state 505 with the generation of a reference coordinate system for the target area 125 using the aforementioned targets 140 as positional references or markers. In one aspect, these positional references are measured a priori to establish a 3D cardinal set (e.g. x/y/z axis) wherein the probe 205 is directed towards the location of each target whereupon a coordinate data measurement is acquired. A set of 2D target coordinates may be obtained by the probe 205 and used to establish a plane defining the 2D area of the target board 130. Subsequently, a plane generally normal to the target board 130 may be identified to establish a 3D coordinate acquisition area. The identified and defined 3D coordinate space of the target area 125 which may then be stored and used as a reference coordinate system for subsequent camera calibration and object data transprojection.

Having established the aforementioned reference coordinate system, in state 505 a camera lock-in procedure is performed in state 510. The lock-in procedure 510 serves to associate the probe and camera coordinates at substantially any position relative to the target area 125 such that both the camera 210 and the targets 140 are related to the same coordinate system. More specifically, the lock-in procedure 510 relates a 2D coordinate system associated with the digitally acquired images from the camera 210 with a 3D coordinate system associated with the physical target area 125, targets 140, and sensing and imaging member 110.

In various embodiments, the aforementioned lock-in procedure 510 further relates the physical coordinates of the targets 140 to their "digitized" or virtual counterparts using a series of transformation parameters which may mimic the camera characteristics using a system solver application. The system solver calculates appropriate camera model or transformation parameters which translate the known physical coordinate system to the virtual coordinate system of acquired images. These parameters may be further defined as a collection of extrinsic parameters representative of the camera 210 embedded in the target area 125, intrinsic parameters representative of the camera model itself, and imaging parameters which relate to how the actual image is scaled to the digital image. Once this procedure 510 has been completed, accurate scaling and representation of image points within the digital image may be accomplished.

Following the lock-in procedure in state 510, a series of target imaging operations are performed in state 515 wherein digital images of the target board 130 are taken from various perspectives, angles, and distances to associate the "digital target area" with the "actual target area". For each image acquired, 3D positional information describing the relative location of the camera 210 (in terms of x/y/z coordinates) may be stored. Furthermore, the relative angle of the camera with respect to the target board 130 may be desirably identified and stored for the purposes of orienting each image with respect to the target area 125.

In various embodiments, the target board 130 and the targets 140 positioned thereon possess a contrasting quality to aid in target resolution. For example, the target board 130 may comprise a substantially white or brightly colored surface upon which more darkly colored targets 140 are positioned at various locations. The contrasting quality between the target board 130 and the targets 140 aids in distinguishing each target 140 and is useful in image processing as will be described in greater detail hereinbelow. The targets 140 may further comprise one or more selected shapes which, for example, may be generally circular or rectangular in form, although other target shapes may be readily used without departing from the scope of the present teachings.

In various embodiments, various target sizes and colorations may be used for purposes of image processing and orientation. For example, in one exemplary approach, a plurality of targets 140 are used the target imaging process 515 including: relatively large black circular targets (approximately 1.0-2.0 inches in diameter), generally medium blue circular targets (approximately 0.25-1.0 inches in diameter), and relatively small black square targets (approximately 0.1-0.25 inches on each side).

In various embodiments, the target imaging operations 515 are coupled with operations directed towards evaluating the acquired images in state 520. Image evaluation 520 comprises assessing the content of each image to determine what portions of the target area 125 and target board 130 have been captured by the camera 210 and furthermore to determine the type and number of targets 140 described within the image. These operations advantageously aid in establishing useful image content and may include identifying a collection of images which adhere to an image quality rule set. Application of the rule set desirably aids in collecting images whose content is suitable use in calibration and transprojection and may include assessments for image boundaries and identification of those images for which a pre-selected number of particular types of targets 140 can be identified within the image.

In various embodiments, application of the aforementioned rule set may be performed in an automated, semi-automated, or manual manner. Automated and semi-automated target assessment may be accomplished using a software/hardware image evaluation program or functionality (e.g. target locator functionality). The target locator may be configured to receive each acquired image and process the image to determine the number and location of targets within the image. In one exemplary approach, target coordinates (e.g. 3D coordinates) within each image may be identified using a flood-fill approach or other suitable methodology. Flood-fill processes are described in detail elsewhere and are generally known to those of skill in the art.

Briefly described, the flood-fill method of target image assessment comprises selecting a seed pixel from a selected image and recursively searching in the general neighborhood of the pixel for pixels which may belong to a selected target 140. Target identification may further be performed by identifying differences in contrast between the target board 130 and the targets 140 wherein the relative luminance or brightness of each image pixel is evaluated. Based on the pixel luminance, a determination may be made as to whether a selected pixel is predicted to be part of a target 140 or not by establishing if the pixel possesses a threshold level or degree of luminance. Using the aforementioned target identification routine in state 520, iterative processing of the target pixels for the image can be performed to putatively identify each of the targets 140 contained within the image.

In various embodiments, the target identification routine may further comprise establishing a baseline image luminance wherein the overall image brightness for each image is assessed. Associating a baseline luminance with each image may be advantageously used to compensate for brightness differences within each image and between images. The baseline luminance information may therefore be used in adjusting contrast or brightness for the purposes of balancing the visual quality of the images to improve clarity, details and smoothness of transition between images thereby improving visual presentation on the display 155.

As previously indicated, the target identification routine may be desirably configured to be performed in a substantially automated manner using a software or hardware-based approach, however, it will be appreciated that manual identification of the targets 140 may also be performed during the image assessment process 420. Furthermore, in establishing the image set to be used in transprojection of coordinate data various selection rules may be used to determine whether selected images should be included in the image set based on the content of each image. Exemplary rules for evaluating image content may include by way of example:

(a) Identifying targets that appear at or near the edge or periphery of an image. In general, it may be acceptable for a target to be partially captured in the image when there are other targets which have been completed contained within the image. The target identification routine may be configured to identify partially visible targets contained in the images and flag or discard these targets and/or images during subsequent use and processing.

(b) For a selected image, the target identification routine may establish if there are a selected number of targets that are identifiable within the image and insure that the targets are suitably complete and visible. For example, in an image having 3 large targets, 8 medium targets, and 3 small targets and having the characteristics described above; the target identification routine may be configured to flag images in which at least 4 medium targets are visible as acceptable for inclusion in the image set. Likewise, an image may be acceptable if all 3 small targets or all 3 large targets are completely visible.

(c) A rule constraint for image selection may be based on the relative location or placement of the camera 210 and/or the relative resolution of the image to aid in selecting images having a desired level of detail or visual clarity. For example, for a selected image having a resolution of 640×480 pixels, the camera 210 position may be desirably set within a range of distances no further than approximately 1-4 feet away from the target board 130 and no closer than approximately 1-6 inches away from the target board 130.

(d) Images may be desirably selected to avoid those in which substantial content is present outside of the bounds of the target area 125 and/or target board 130. Alternatively, the region outside of the bounds of the target area 125 may be filled-in electronically (e.g. white or black color filled) to avoid distractions from the image content.

(e) Images with partial, incomplete, or unevenly distributed lighting may be identified and discarded so as to avoid shadows over the target board 130 or objects contained therein.

During the target location and identification process in state 520, if an error in target location or identification is observed or if the image fails to conform to the selected set of standards or rules; a notice of flag may be provided indicating that another image should be acquired to replace the undesirable image. Alternatively, the transprojection system 100 may provide means for automatically acquiring replacement images using as a reference the camera coordinates and relative positioning of the camera 210 where the image was taken. In other embodiments, images that fail to conform to the selected set of standards or rules may be modified, enhanced, or doctored so as to make them more desirable for use in the target set. The system further provides the ability to test, identify, and/or resolve target locations for substantially any image acquired by the camera 210. Taken together, these functionalities aid in generating images that are suitable for accurate calibration of the camera 210 with respect to the probe 205 and reference coordinate system.

Upon the determination that a sufficient number of images have been acquired in state 525, the process 500 proceeds to an initial target transprojection procedure 530. During target transprojection 530, targets 140 that had been previously identified and validated during the target imaging 515 and image assessment 520 stages are selected from based upon the type of image being visualized. In one aspect, smaller targets are desirably used for "close-up" images and larger targets are used for images wherein a preselected number of the large targets are discernable within the image.

In the transprojection stage 530 3D coordinates for selected targets as determined by the probe 205 are processed using an initial camera model parameter set to associate the coordinates with the corresponding 2D coordinates of the relevant digital image of the target. The selected targets and their coordinates are representative of computed targets which simulate the image acquisition characteristics of the camera 210 to thereby model and identify the appropriate region in the digital image where the target resides.

Thereafter, the process 500 proceeds to a target correlation stage 535 wherein the computed targets and the actual targets are aligned. In one aspect, target alignment comprises performing operations which may include translation, rotation, and/or scaling to correlate the coordinates of the computed and actual targets (e.g. "match-up" the selected targets). Thereafter, the transformation operations may be applied to remaining targets within the image to complete the mapping of computed image targets to actual targets. In one aspect, target mapping is performed by mapping each actual target to substantially the closest computed target.

Following target correlation in state 535, an error metric determination is performed in state 540. In various embodiments, determination of the error metric is accomplished using a root-mean-square error approach which is used to compute relative error between each pair of computed and actual targets over substantially all targets within substantially all of the acquired images of the image set. In performing this series of operations, each image may be correlated to one another with the calculated error advantageously used to aid in perspective evaluation and visualization. Error determination according to the aforementioned description may further utilize an enhanced weighted approach in which error metrics are determined on the basis of the distance from the object for which a selected image was acquired. For example, close-up image errors may vary from far-off image errors using this weighted approach to further refine how the targets are subsequently correlated across all images in the image set.

In state 550, an error minimization operation may be performed in which the previously determined errors for each image are correlated and a resulting set of estimated or calculated camera calibration parameters are generated. The camera calibration parameters when applied to acquired images and coordinate measurements enable an accurate transprojection or overlay of the coordinate measurements upon the acquired images.

Once the camera calibration parameters have been established, the CMM apparatus may be used to perform routine object telemetry acquisition wherein as coordinate data is acquired is it digitally overlaid upon on appropriate image of the object. Various exemplary screenshots of how the transprojection may appear to a user are shown in FIGS. 6 A-F.

FIG. 6A illustrates an exemplary transprojection representation 600 for an object 605. In this example, the object 605 comprises a generally planar member having a plurality of features 610 including through-going holes 615-625 of various shapes and sizes. Coordinate data acquired during probe acquisition of selected features 610 is shown as line renderings 630 transprojected upon the digital representation of the object image 605.

As previously described, the transprojection system 100 generates each line rendering 630 on the basis of acquired coordinate data obtained from the probe-member 215 which is associated and scaled to the appropriate object image taken from various perspectives. The calibrated environment of the transprojection system 100 allows the coordinate data to be associated with the various perspectives inherent in each object image 605 such that when the coordinate data is transprojected upon the image 605 it is accurately scaled to the various object features 610. As shown, coordinate data for each of the through-going holes is automatically and accurately overlaid upon the object image 605 in the appropriate location of the object feature 610 without requiring significant user manipulation of the coordinate data or the object image itself.

In various embodiments, during the coordinate data acquisition process, the relative location of the probe 205 may be evaluated to determine an appropriate digital image to display. For example, the transprojection system 100 may advantageously select from various stored image perspectives of the object and display an image having a particular perspective on the basis of the probe location. As the probe is moved from one position to another, the displayed image may be automatically changed by the system which selects another object image having a particular perspective that correlates with the current probe position. This manner of perspective switching may be accomplished as a result of each object image being associated with the coordinates for the location from which the image was acquired. Each image may further be associated with a range of probe locations or positions and displayed when the probe 205 resides in the selected range. Thus, in various embodiments the association of coordinate data or location from which the object image was taken provides a means to determine the appropriate image to display during "live" data acquisition. Furthermore, the display of object images may be manually controlled such that the user can view a desired image or perspective selected from the stored or available images.

Coordinate data acquired from the object features may further be transprojected upon the images in each perspective and rendered to be consistent with the view of the object from a particular perspective. Thus, coordinate data obtained for the object and displayed as shown in FIG. 6A may further be transprojected onto other image perspectives as shown in FIG. 6B. In this Figure, an object image has been acquired from a slightly different perspective which may be desirably viewed by the user. In this perspective, the details of the holes differ somewhat as the thickness of the object becomes more discernable. The coordinate data accurately tracks the location of the object features in this perspective as before by associating the relative location from which the image was obtained with the coordinate date for each feature.

The ability to switch view perspectives during coordinate data acquisition while maintaining accurate transprojection of line renderings 630 is particularly useful. In one aspect, this feature allows a user to better ascertain available coordinate data and determine what other data may be desirably acquired. For example, in switching perspective views of the object image, the user may determine that additional coordinate data is desirable to acquire with respect to the width of the object or depth of the hole. The utility provided by coupling accurate transprojection of coordinate data for selected object images in various perspectives will be appreciated by those of skill in the art. In particular, the system's ability to provide accurate line renderings 630 taken and associated with one object perspective or view and translated into another object image in a different perspective significantly improves the functionality of the system and provides a number of useful features.

In one aspect, the transprojection system 100 may be provide an automatic or manual perspective-switching functionality wherein an image of the object taken from one perspective is translated into another. For example, the perspective view of the image may be adjusted in a variety of ways including but not limited to: zooming, panning, rotating, cropping, adjusting color, adjusting contrast, stretching, and a wide range of other operations that may be desirable to perform on the object image while maintaining an accurate scaled representation of the transprojected coordinate data. In one embodiment, an image taken at a particular camera location and angle can be automatically adjusted to conform to a desired standard format. In particular, the system 100 may provide functionality for performing a series of automatic, semi-automatic, or manual adjustments to the object image (such as that shown in FIG. 68) to generate a new image or rendering of the object conforming to a desired set of criteria. For example, the system 100 may be configured to recognize the angle of the camera 210 at the time a digital image is acquired and automatically re-orient the image as desired. Image re-orientation in this manner may be performed to generate a "normalized" object view such that each image is adjusted to represent/emulate the object from a camera view of a selected distance and angle from the object.

Such an operation is shown by way of example in FIG. 6C wherein the image has been rotated to conform to a desired view of the object. This manner of automatic view or perspective adjustment may be useful to help the user correlate the various object images without the need to adjust each image manually. For example, the operations used to perform the image adjustments shown in FIG. 6C may include modifying the image size/zoom parameters, rotating the image, and adjusting the color/contrast of the image. Similar operations may be automatically performed on other images to preserve or obtain a desired or selected perspective in some or all of the images acquired for the object. It will be appreciated that this manner of perspective modification desirably improves the ease with which the geometry data may be viewed and interpreted. Furthermore, this functionality helps to alleviate restrictions which might otherwise be imposed during camera positioning in image acquisition and allows the user more flexibility in acquiring images with respect to the camera angle and distance from the object.

Figure 6D:
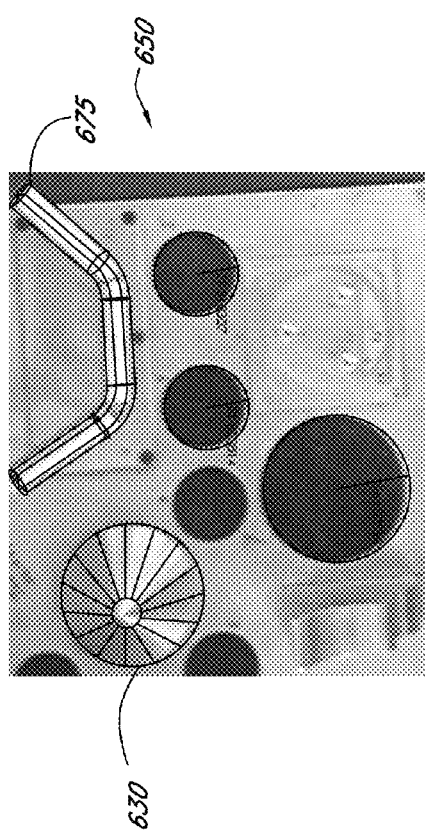
Figure 6F:
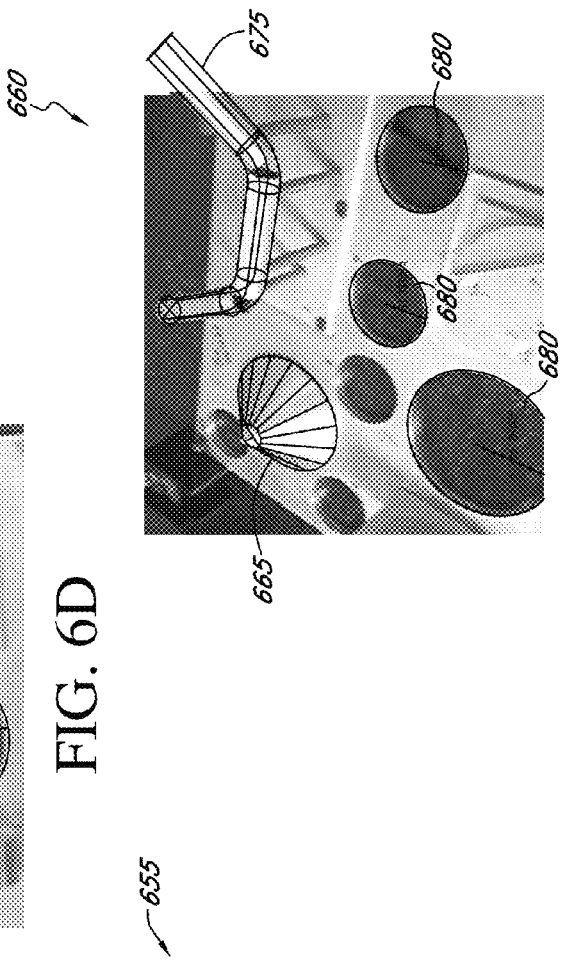

FIGS. 60-6F illustrate another series of object image transprojections 650, 655 and 660 in which selected object features 665, 675 are shown from different views corresponding to various perspectives. The transprojection on the object image illustrates how the shape and contour of each feature 655, 675 is accurately tracked by the line renderings 630. In various embodiments, components of the line rendering 630 and/or the object image itself can be selectively toggled on/off as desired so that each component which make up the transprojection can be viewed independently. Thus the line renderings 630 can be viewed in the absence of the object image or alternatively the object image may be viewed without some or all of the line renderings 630.

Combining the object image details with the line renderings 630 by transprojection in the aforementioned manner enhances the visualization of how the line renderings 630 relate to the object. For example, in FIG. 6E, the line renderings 630 transprojected upon the conically shaped object 665 and generally cylindrical sections 675 can be easily recognized. Furthermore, as show in FIG. 6F, a portion 675 of the line rendering 630 which extends outside of the bounds of a selected image view may still be rendered to show the object feature. Alternatively, line renderings 630 may be cropped to substantially the same bounds as the image. As is also illustrated, additional informational details 680 may be transprojected upon the object image including for example; object feature dimensions or measurements (e.g. circle diameters, size details, angle measurements, etc).

As will be appreciated by one of skill in the art, the transprojection of information as described improves the user's ability to visualize the coordinate data. This functionality is further enhanced by the generally highly accurate scaling and correlation between the line renderings 630 and the object image. Such transprojections are useful not only for reviewing coordinate data after complete acquisition of object telemetry details but also valuable during the coordinate data acquisition process. Furthermore, transprojection in the disclosed manner may be used to facilitate automated or remote coordinate data acquisition allowing a user to view the object details in "real-time" while acquiring telemetry details. Also, the transprojection process can be adapted to robotic methods wherein coordinate data acquisition is performed in an automated or semi-automated manner.

Figure 6E:
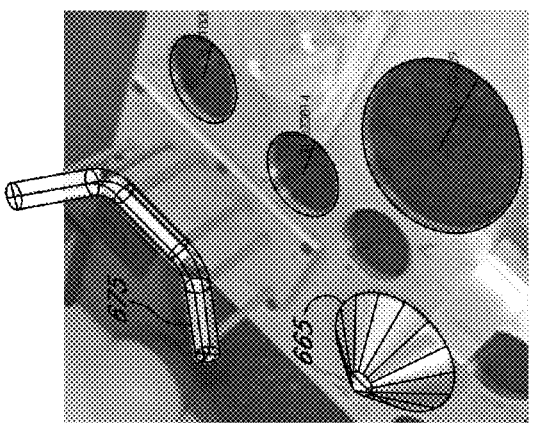
Figure 6G:
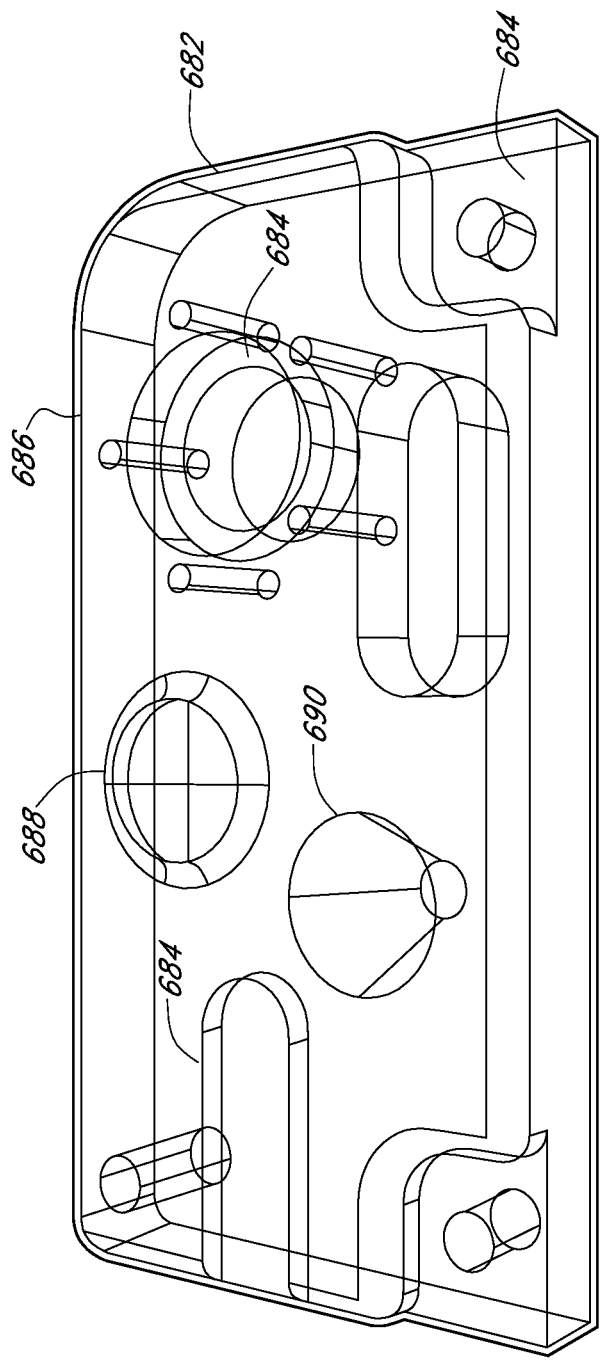
Figure 6H:
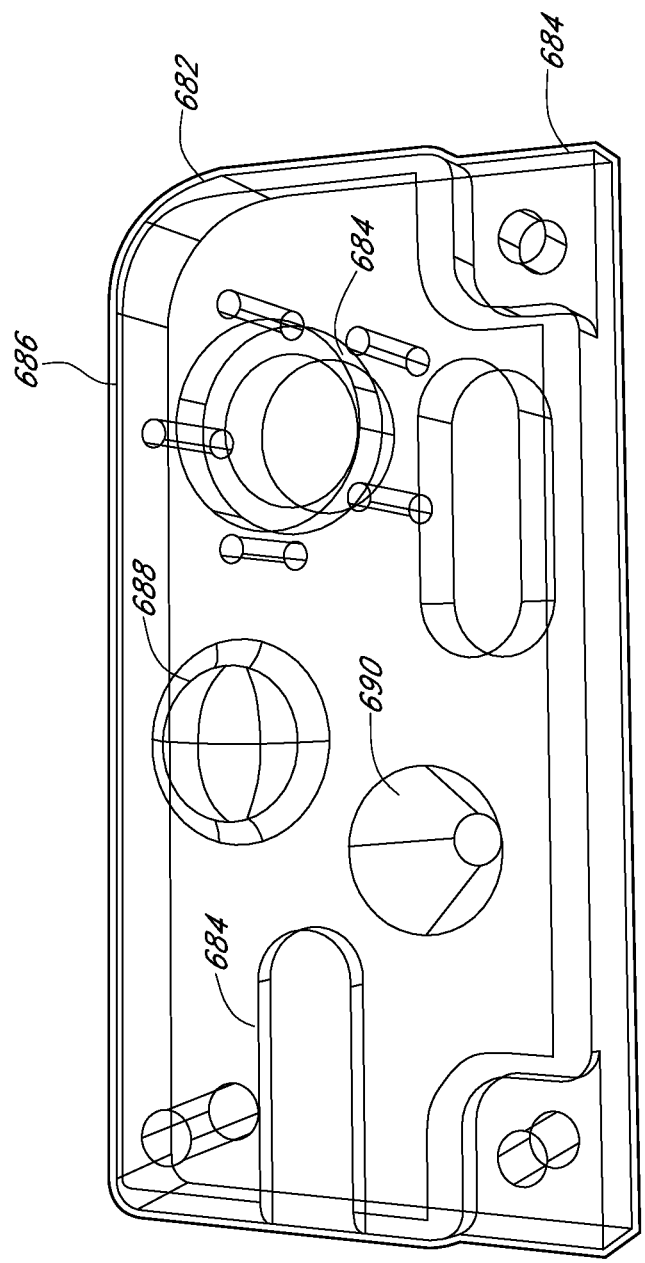
Figure 6I:
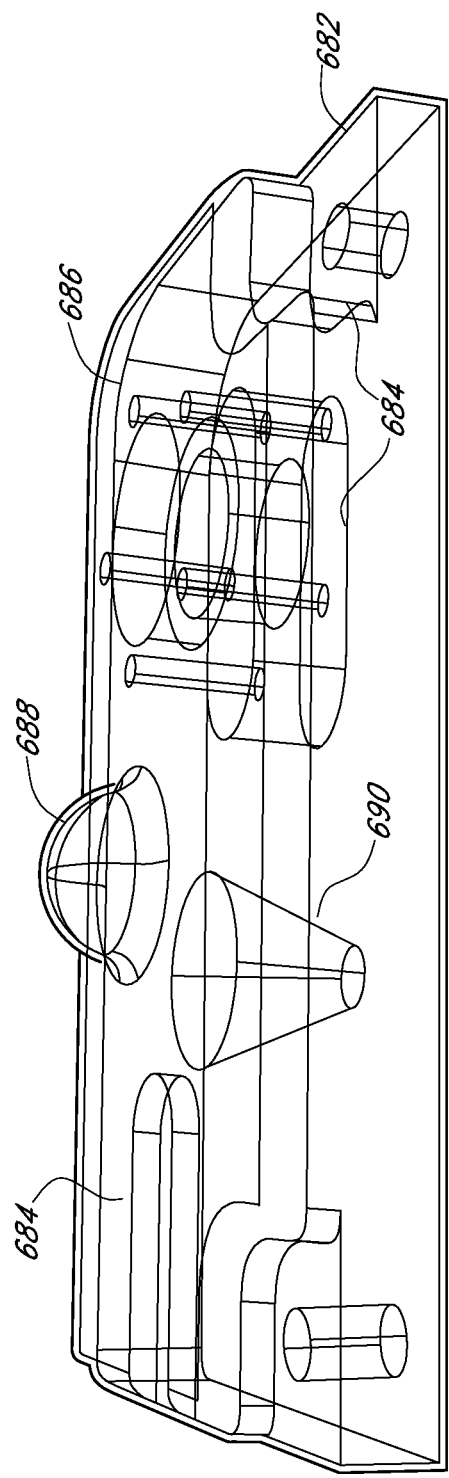

FIGS. 6G-6I further illustrate how the transprojection process allows geometry data and image data to be simultaneously visualized wherein each data type is accurately scaled with respect to one another. In these Figures, digital images corresponding to various views of an object 682 taken from different angles and perspectives are shown. The object 682 comprises a plurality of features and contours 684 further comprising holes, depressions, protrusions, and other surface structures which generally define the shape and form of the object 682. Transprojected geometry data lines 686 trace or outline the features and contours 684 in such a manner as to improve the visualization of both the image data and the geometry data.

As previously indicated, the transprojection methods described herein provide a means to accurately "overlay" the image data with corresponding geometry data giving perspective and depth to the image data. Using a multiplicity of images corresponding to different views and angles of the object 682, the geometry data may be interpolated or extrapolated to fit the features and contours 684 of the object from each selected view.

Thus the two top-down views of the object 682 shown in FIGS. 6G and 6H taken from slightly different angles show how that the geometry data lines up or overlays the corresponding features in such a manner so as to accurately reflect the object features and contours 684 in each view. In a similar manner, the side view of the object shown in FIG. 6I provides a different perspective in which the details of the height and depth of the features and contours 684 can be more readily observed and appreciated.

Combined review of the object from the different perspectives aids in distinguishing the characteristics of certain features which may be more clearly represented in selected views or combinations of views. For example, the combined views improve the visualization of the rounded protrusion 688 extending from the surface of the object 682 and the conical hole 690 extending through the object 682. In this regard, details of these features 684 can be visualized by combining the top views (FIG. 6G, 6H) and side views (FIG. 6I) to gain a better appreciation of the structure of these features.

One desirable feature of the transprojection system of the present teachings is that the image angle or distance away from the object 682 for any selected view need not be fixed. The system is able to ascertain this image information automatically and transproject the geometry data appropriately without requiring the geometry data to be acquired at the same time or from the same angle and perspective as the image. Thus, images taken at substantially any view, angle, or distance from the object 682 may be accurately related to geometry data pertaining to the object 682.

Certain aspects of the transprojection process relate to generating a desired image perspective and/or coordinate data scaling factor based on the known position from which the image was acquired with reference to the target area. Transprojection in this manner may include performing a series of transformations using an acquired image to produce a new image in a desired view perspective. Transformations of this type may be analogized to the steps taken when generating photographs with a camera. For example, achieving a desired image reflecting a scene or object from a selected perspective may include the steps of: (a) performing a viewing transformation analogous to positioning a camera in a selected location such that the camera will acquire an image of a scene at a desired distance, orientation and perspective; (b) performing a modeling transformation analogous to arranging the scene to be photographed into a desired composition; (c) performing a projection transformation analogous to selecting a camera lens or adjusting the zooming or scaling of the image; and (d) performing a viewport transformation analogous to determining how large the final image should be.

The aforementioned transformations and methods for implementing these transformations in the context of a computer or electronic rendering means are described in further detail in the textbook "Open GL Programming Guide", Second Edition, Mason Woo, Jackie Neider, and Tom Davis (see examples described in Chapter 3 and elsewhere) which is hereby incorporated by reference in its entirety. Furthermore, additional details regarding the mathematical theory behind the transformation operations and their implementation in computer language can be found in the textbook "Computer Graphics; Principals and Practice", by Foley, VanDam, Feiner, and Hughes (see examples described in Chapter 5 and elsewhere) which is hereby incorporated by reference in its entirety.

Figure 7:
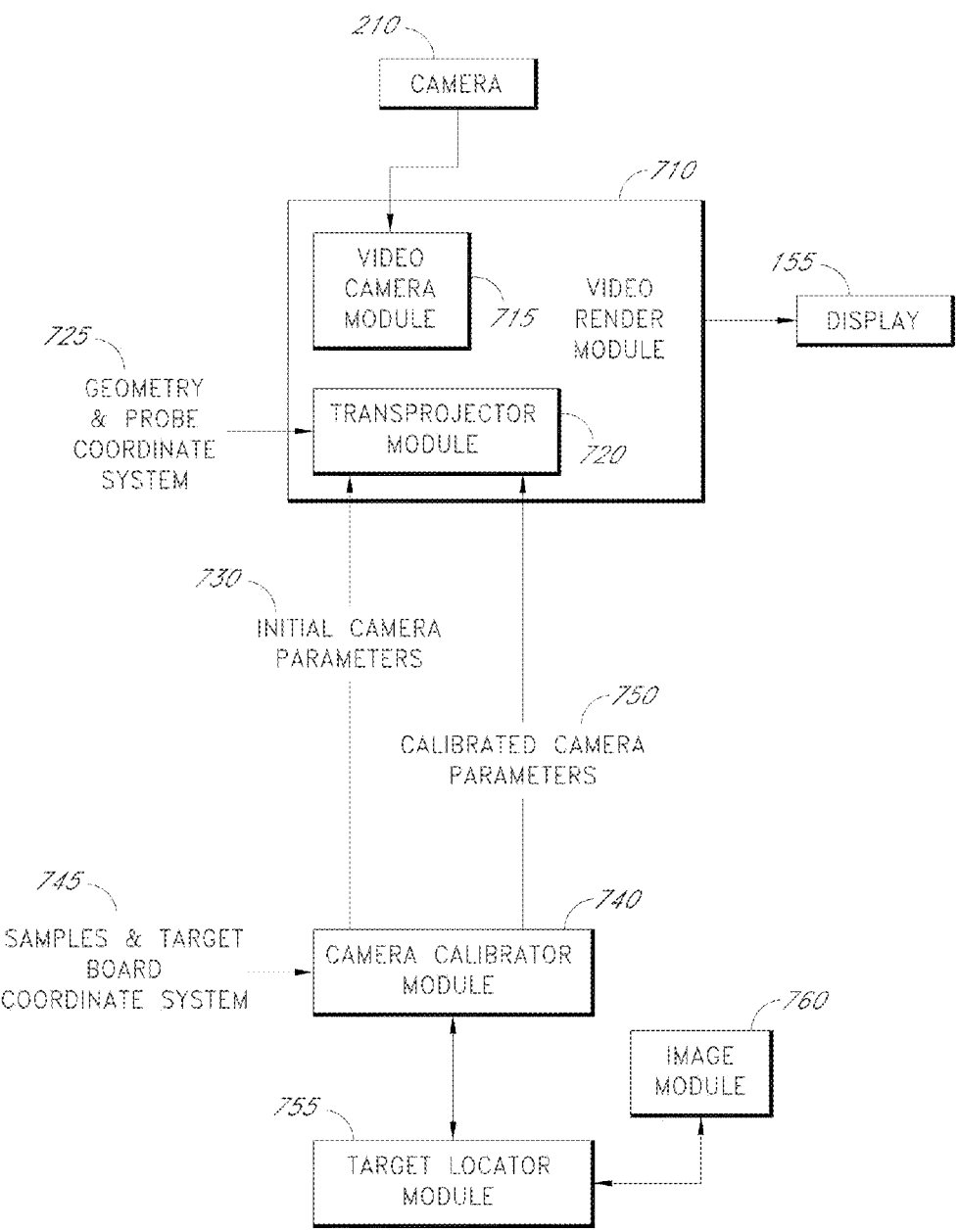
FIG. 7 illustrates the component architecture and modules associated with the transprojection system.
Figure 8:
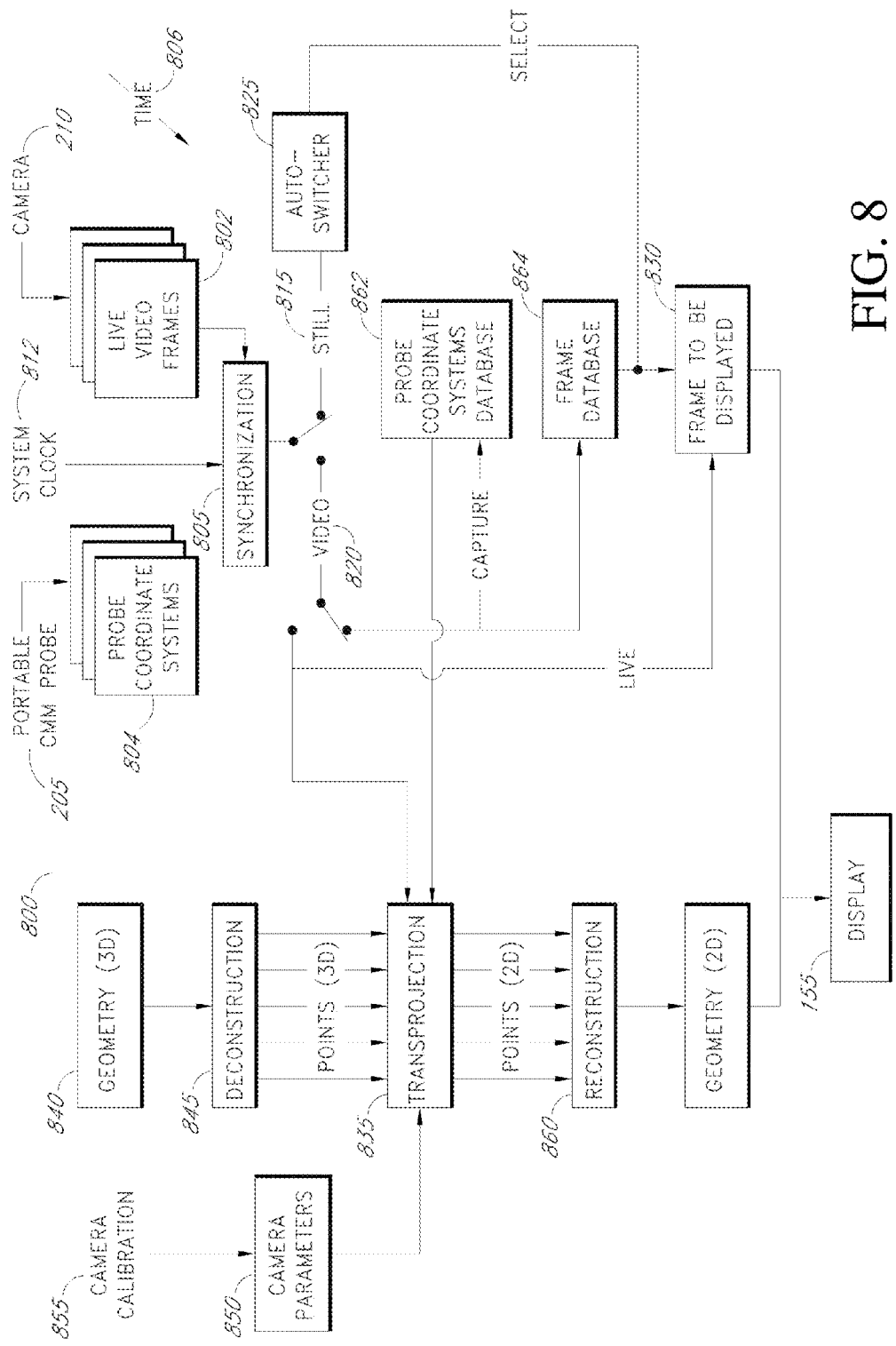
FIG. 8 illustrates a block diagram of the various components and functionalities of the object image transprojection process.

Development and application of transformation operations associated with the transprojection of coordinate data upon image data are described in detail in FIGS. 7-9. In one aspect, coordinate data transprojection may be characterized as those operations used to scale a selected image in an appropriate view or orientation and subsequently overlaying the coordinate data on the image in such a manner so as to accurately reflect object features defined by the coordinate data in the context of the image data. It will be appreciated that the disclosed methods represent examples of how the transprojection process may be accomplished. It is conceived however, that modifications to the disclosed methods or other transformation implementations used in conjunction with coordinate data transprojection represent but other embodiments of the present teachings.

FIG. 7 illustrates the component architecture and modules associated with the transprojection system 100. Through the operation of these modules the transprojection system 100 provides a means for the user to view transprojected images on the display 155 associated with the computer system 150. As will be appreciated by one of skill in the art, the software components and functionalities described below may be modified to combine or separate certain features and provide additional functionalities as desired. The illustrated architecture is therefore conceived to be but one embodiment of how the presently disclosed transprojection methods may be implemented and should not be considered limiting as to the manner in which these methods are achieved.

In displaying the transprojected data and information, the software architecture allows for "live" viewing of coordinate data acquisition wherein geometry data generated by the probe 205 is translated and projected upon object images with relatively little, if any, delay. In this mode, the current probe/camera position may be ascertained by the software and an appropriate view of the object selected or generated along with the corresponding transprojected coordinate data from this perspective. As the probe position is changed with respect to the object, the image and coordinate data displayed to the user may similarly change to reflect the new probe position.

In one aspect, the software performance is such that data may be transprojected using relatively high frame rates for images, including full-motion video, wherein the location of the probe with respect to the object is tracked in fine detail with the images and geometry data displayed to the user appearing to fluidly move or rotate as the probe is moved about the object. Additionally, the software architecture may provide for a "review" mode wherein previously stored images and data of an object are viewable and movement of the probe 205 about the object simulated without actually moving the probe 205 from one position to another. Thus, the aforementioned display modes provide the user with a significant degree of flexibility in viewing transprojection data to not only aid in coordinate acquisition but also to review the data after its collection is complete.

Referring again to FIG. 7, transprojected data shown on the display is generated, processed, and transmitted by a video render module 710. In various embodiments, this module 710 represents a software module comprising two sub-modules including a video camera module 715 and a transprojector module 720. The camera module 715 is configured to receive input in the form of imaging data which is transmitted from the camera 210. The imaging data may be transmitted directly from the camera 210 or alternatively the imaging data may be first stored in a database or image archive that is retrieved by the software on the basis of a desired view, perspective, or probe position. The imaging data may further take the form of a collection of still images (digital snapshots) of the object taken from various perspectives or angles which will be subsequently overlaid with the scaled coordinate data. Alternatively, the video render module 710 may be configured to receive full-motion video as input. In various embodiments, the operations used to process still images and full-motion video are similar as the video images can be reduced to a series of frames analogous to a series of still images. As previously indicated the speed and efficiency of data processing and projection is sufficient for even high frame rate applications where the system 100 can process and transproject the coordinate data in substantially real-time with full motion video.

The transprojector module 720 represents the software component that provides the principal functionality for transprojection of the coordinate data upon images and/or video data. In one aspect, the transprojector module 720 receives geometry and probe coordinate system information and generates an initial camera parameter set 730 used in camera calibration and image scaling. The initial camera parameter set reflects the general setup of the CMM environment an may take into account characteristics of the acquisition environment as well as camera, probe, and arm characteristics useful in establishing the scaling parameters that should be used to transproject the coordinate data upon the images. In one aspect, the initial camera parameter set provided an estimated parameter set that is established 'a priori' and is subsequently adjusted and refined to take into account slight alterations and variability's in the CMM environment and equipment.

During camera and CMM environment calibration, the initial parameters 730 are passed to a calibrator module 740 which receives this information along with information relating to the object and target board coordinate system 745 to generate a calibrated parameter set 750 which is passed back to the transprojector module 720. The calibrated parameter set 750 reflects operations necessary to translate 3D coordinate data into 2D coordinate data that may be accurately transprojected upon the desired image. In one aspect, these operations may further take into account required data translations, rotations, and image offset parameters. In various embodiments, generation of the calibrated camera parameter set 750 occurs through the application of the previously described camera calibration process 500 illustrated in FIG. 5.

The calibrator module 740 is further associated with a target locator module 755 which is used in the camera calibration process 500 to locate and distinguish the targets 140 of the target board 130. As previously described, the locator module 755 may provide functionality for automatically identifying targets 140 on the target board 130 on the basis of differences in contrast or brightness between the targets 140 and the target board 130. The target locator module 755 may further provide the capability to distinguish between different types of targets 140 on the basis of size, coloration, shape, etc.

An image module 760 provides reference images to the target locator module 755 for use in identification of the location and type of targets 140 in the images taken during the calibration process 500. In one aspect, this information includes a bitmap image of the target board 130 along with pixel intensities that are used by the target locator module 755 in ascertaining the location of each target 140 on the target board 130. The target locator module 755 uses the information derived from the image module 760 to identify the targets 140 within the images provided and returns an array or group of points associated with each target 140 within the images along with associated coordinate data to the camera calibrator module 740. The calibrator module 740 then uses this information along with initial camera parameters 730 to establish the calibrated parameters 750 that may be used to accurately transproject the coordinate data onto each image provided by the video camera module 715.

In various embodiments, the calibrator module 740, evaluates the location of targets 140 within each image on the basis, of various input parameters and data. Using these input parameters, the relative location of each target 140 within each image may be determined through the association of some or all of the following information: (1) coordinate information relating to the measurement of each target position as determined by coordination acquisition obtained from the probe 140; (2) coordinate data associated with the probe position; and (3) various images taken from different perspectives in which the targets 140 can be visualized. In one aspect, the calibrator module 740 receives as input imaging coordinates associated with various object images within which the targets 140 can be identified. Furthermore, the calibrator module 740 may receive information relating to a selected reference coordinate system associated with a particular CMM environment. In various embodiments, information relating to a plurality of different reference coordinate systems defining different CMM environments may be stored and selectively retrieved. Each CMM environment may further be defined by its various characteristics which may affect the calibration and transprojection process, and may include for example: characteristics of a selected target board 130 and various target, arm, probe, and/or camera configurations.

Taken together, the input data received by the calibrator module 740 is used to relate the 3D coordinate information acquired by the probe 140 with the 2D information of the image such that the coordinate information is scaled, translated and oriented in such a manner so that a 2D representation of the coordinate information may be defined and accurately overlaid upon the object image during transprojection. In one aspect, the calibrated camera parameters 750 generated by the calibrator module 740 provide a means to estimate and account for errors, discrepancies, or variability's between an actual or physical coordinate system in which the object exists and a simulated or computer-generated coordinate system used to model the CMM environment.

FIG. 8 illustrates a detailed overview of the object image transprojection process 800. These operations are principally associated with the aforementioned renderer module 710 to generate transprojected images that can be viewed on the display 155. In one aspect, incoming data acquired from the probe 205 and camera 210 are subjected to a synchronization process 805 to associate a plurality of images or frames 802 generated by the camera 210 with appropriate coordinate systems 804 for the probe 205 at the time the image was taken.

For each image frame 802 captured, the system 100 relates its 2D image information with a particular 3D coordinate set 804 for the probe 205. This interrelating of incoming data desirably allows the perspective or angle from which the image was taken to be ascertained and further is used in identifying the appropriate image to display on the basis of the probe position.

In one aspect, the synchronization process 805 relates the image frame 802 and probe coordinate system 804 information on the basis of embedded timestamps 806. The timestamp information 806 further provides a means to accurately associate the information arising from the different sources (e.g. probe 205 and camera 210) and can be configured to account for any delays or offsets between the sources. Following synchronization, the associated image/coordinate information can be stored for subsequent retrieval and processing thereby providing an effective "sliding window" of interrelated information. In another aspect, the associated image/coordinate information can be processed or utilized on-the-fly via a "live" mode as will be described in greater detail hereinbelow.

Synchronization can be achieved in any number of ways, and in one aspect, a system clock 812 provides a means to supply the timestamp information 806 which is associated with each image frame 802 and probe coordinate system 804. Use of the system clock 810 in this manner desirably provides a convenient means to synchronize the two sources of information in a uniform manner and avoids problems that may arise as a result of having two independent sources of timestamps.

As previously indicated the type of images acquired by the transprojection system 100 may comprise still image visualizations of the data or a video visualization of the data. During still image visualization 815, a plurality of images are captured from different perspectives and angles and stored for later use. Each image is associated with a selected probe position or range of positions whereby when the probes coordinates are within a selected range of values, the image corresponding to the range is displayed. An auto-switcher process 825 is responsible for ascertaining the probe position and coordinates and identifying the appropriate image which is loaded from storage and displayed on the display 155. As the probe moves to other coordinates, the auto-switcher process 825 may automatically identify the appropriate image to retrieve and display based on a best match approach wherein the image having the closest associated coordinate range to the current probe position is selected as the image frame to be displayed 830.

Concurrent with the selection of the image frame to be displayed, the probe coordinate system 804 associated with the selected image is identified and utilized in a transprojection process 835. The appropriate coordinate system 804 to utilize during transprojection operations is typically that which has been synchronized to the image frame 802 by the synchronization process 805 described above.

In one aspect, transprojection of coordinate data occurs through a series of operations wherein coordinate or geometry data is received 840 from the probe 205 in the form of coordinate data graphic representations which may comprise: points, lines, circles, arcs, curves, and other objects. Each graphic representation comprises 3D coordinate data which may be subjected to a deconstruction process 845. During the deconstruction process 845, each graphic representation may be reduced to a series of point-wise linear approximations wherein a selected object is represented by a plurality of interconnected points. For example, any line, arc, circle, etc. present in the coordinate data may be represented as an ordered set of points joined by line segments wherein each point is associated with a three dimensional position to identify its relative location in the target space 125.

The deconstructed point information corresponding to the graphic representations of the coordinate data is then operated upon processed by the transprojection process 835 whereby the 3D coordinates are transformed into appropriate 2D coordinates associated with the image coordinate system. In one aspect, the transprojection process 835 performs this operation using the probe coordinate system information 804 associated with each image 802 and a calibration parameter set retrieved from stored camera parameters 850 previously determined in the camera calibration process 855. Taken together this information provides the proper scaling and transformation operations necessary to render the 3D coordinate data in the 2D space of the image.

The 2D coordinate data may further be operated upon by a reconstruction process 860 wherein the ordered set of points is converted back into the appropriate graphic representation (e.g. line, arc, curve, circle, etc). The resulting 2D object data may then be accurately transprojected or overlaid upon the image being displayed.

In various embodiments, the aforementioned transprojection processes are generally performed for each image identified by the auto-switcher process 825. As new or additional coordinate or geometry data is received which is to be associated with a selected image, the information may rapidly undergo the deconstruction/transprojection reconstruction processes to yield the desired scaled data. In one aspect, a memory and/or storage buffer may be implemented to store coordinate data that has undergone transprojection scaling such that the data need not necessarily be recalculated each time a particular image view is selected. The system may be further configured to ascertain whether the coordinate data has been previously scaled from another transprojection and retrieve this information from the memory and/or storage buffer to further improve performance. Such an implementation desirably frees the transprojection system 100 from having to perform redundant computations and instead directs these processes to operate on coordinate data that lacks a suitable scaled transprojection.

In addition to the still image mode in which the auto-switcher process 825 selects images based on probe 205 positioning. The system 100 may operate in a video mode capable of displaying image data in real time or near real time. In one aspect, the video mode comprises a frame capture mode wherein images acquired by the camera 210 are shown on the display 155 as the camera 210 and probe 205 are moved about the object. In this mode, the current view on the display substantially corresponds to the object as "seen" from the perceptive of the camera 210.

Similar to the still image mode, data captured during the video mode corresponds to a plurality of image frames 802 which make up the captured video along with synchronized probe coordinate information 804. The image frames 804 may be stored in a frame database 864 for temporary storage while the coordinate information 804 is passed to the transprojection process 835 for scaling and rendering as described above for the still image information. Once the transprojection computations are complete, the frame associated with a particular set of transprojection data may be retrieved 830 and displayed in conjunction with the scaled coordinate data. The highly efficient and rapid processing capabilities of the transprojection system 100 provide for little if any significant delay in displaying the video frames along with the transprojected data.

One benefit of capturing video frame data for purposes of transprojection is that a relatively large number of images may acquired and stored for subsequent evaluation and display. When this information is used to track the movement of the probe 205 or camera 210, the resulting images displayed possess an improved degree of fluidity when visualizing from one perspective to another. Thus, the user perceives the images appearing on the display 155 to track the motion of the camera 210/probe 205 in a real time fashion.

In another aspect, the video image data may be viewed in a live mode wherein transprojection coordinate data is calculated "on the fly" without temporary storage of the image frames. In this mode, the synchronized probe coordinate system data 804 is forwarded to the transprojection process 835 while corresponding image frames are prepared and forwarded to the display 830. Transprojection coordinate data calculations are sufficiently rapid to allow data and image visualization with little or no lag time thereby providing the user with an accurate assessment of the coordinate data as it is being viewed and captured.

Figures 9A, 9B:
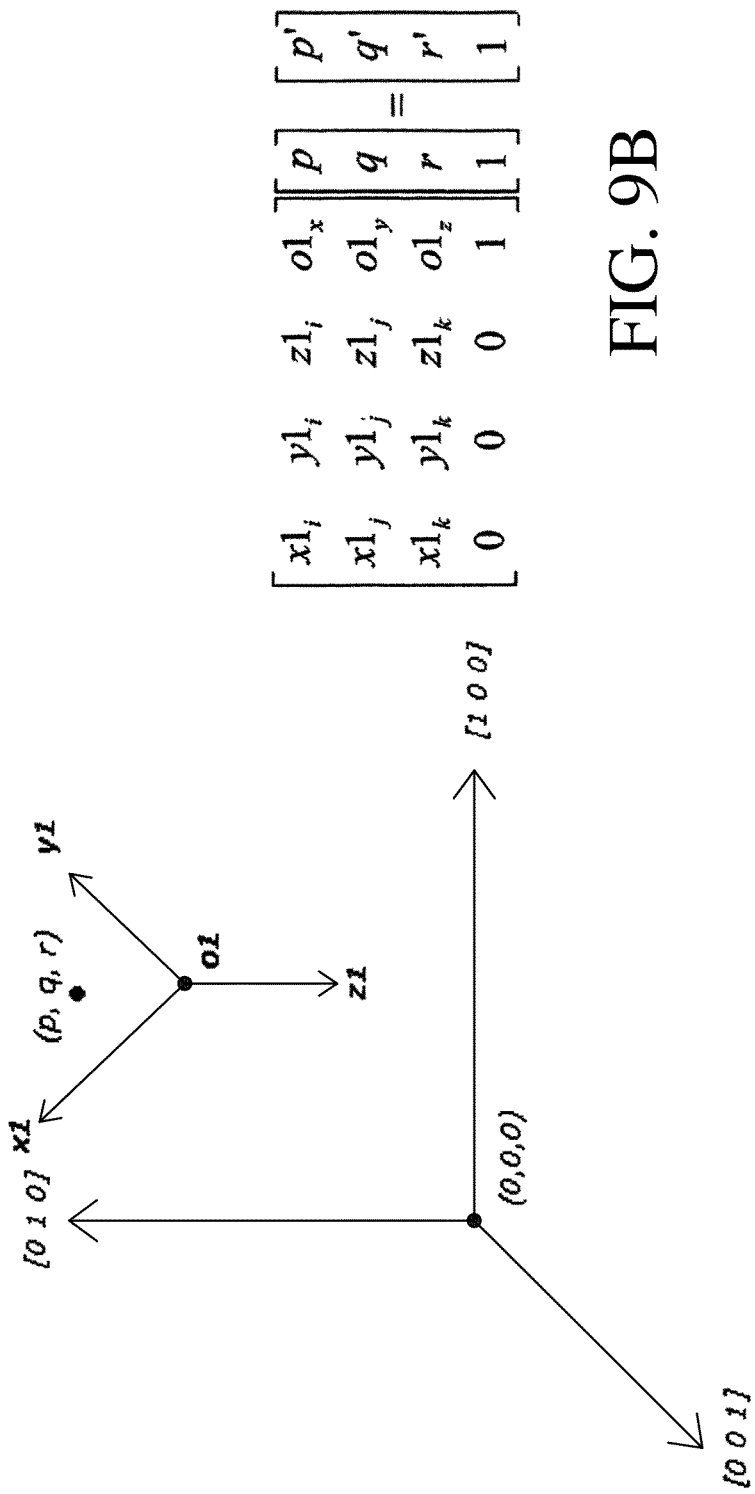
FIG. 9A illustrates an exemplary global coordinate system and the translation operations for aligning image data in the global coordinate system.
FIG. 9B illustrates an exemplary transformation matrix used to relate points to the global coordinate system.

FIGS. 9A-B further describe the operations associated with coordinate system transformations used by the transprojection system 100. In the following discussion lower-case boldface letters are used to indicate points and vectors; capital boldface letters are used to indicate matrices; and italic letters are used to indicate scalars. Furthermore, the coordinate system is defined to include the origin and three axes (for example x,y,z or i,j,k). The matrices are represented in column major format and a post-multiplication operation may be performed in which each matrix may be post-multiplied with a column vector when multiplying a matrix with a vector (as compared to pre-multiplying a matrix with a row vector in row major format).

Referring to FIG. 9A, the global coordinate system is referred to as the cardinal system I and may be representative of the target area in which the object and target are at least partially contained. The global coordinate system may be defined by the point o (0,0,0) representing the origin and basis vectors x [1 0 0], y [0 1 0], and z [0 0 1] representing the x, y, and z axes respectively. Furthermore, the first coordinate system designated C1 may reflect the position, location, and or orientation of the image acquisition device, image, or point within the image, given by o1 ($o1_x$, $o1_y$, $o1_z$), x1 [$x1_x$, $x1_y$, $x1_z$], y1 [$y1_x$, $y1_y$, $y1_z$], and z1 [$z1_x$, $z1_y$, $z1_z$], and the second coordinate system (not shown) designated C2 may reflect the transformed position of the image acquisition device, image, or point within the image, given by o2 ($o2_x$, $o2_y$, $o2_z$), x2 [$x2_x$, $x2_y$, $x2_z$], y2 [$y2_x$, $y2_y$, $y2_z$], and z2 [$z2_x$, $z2_y$, $z2_z$] both relative to the cardinal system.

According to certain embodiments of the present teachings a coordinate system transformation refers to the transformation matrix that will transform a point defined in C1 to a point in C2. This transformation relates to determining what are the coordinates of a selected point in C1 relative to C2 wherein the transformation is constructed to transform the selected point. In one aspect, C1 and C2 are related to each other by inclusion in the same global coordinate system. Based on this information, the transformation may be developed in two general steps which include: (a) Constructing the transformation matrix from C1 to I and (b) Constructing the transformation matrix from I to C2. In certain embodiments, the aforementioned transformation steps may be combined into a single step by multiplying the resulting matrices.

As shown in FIG. 9A, point p (p, q, r) is defined in coordinate system C1 and C1 itself is defined relative to the cardinal system. From this information, it can be determined that the point p relative to the cardinal system (referred to as p' (p', q', r') may be defined by the following equation:

$$p'=o1+px1+qy1+rz1 \qquad \text{Equation 1}$$

According to this equation, the point information is determined as the sum of the origin and each of the coordinates of the point multiplied by a basis vector. The matrix shown in FIG. 9B may then be used to transform p into the cardinal system. In one aspect, to construct the second matrix, a first matrix construction is performed that goes from CS2 to I, as shown in FIG. 9B. The second matrix will then be the inverse of that matrix. Finally, the two matrices may be multiplied together to obtain the resultant transformation.

Figure 9C:
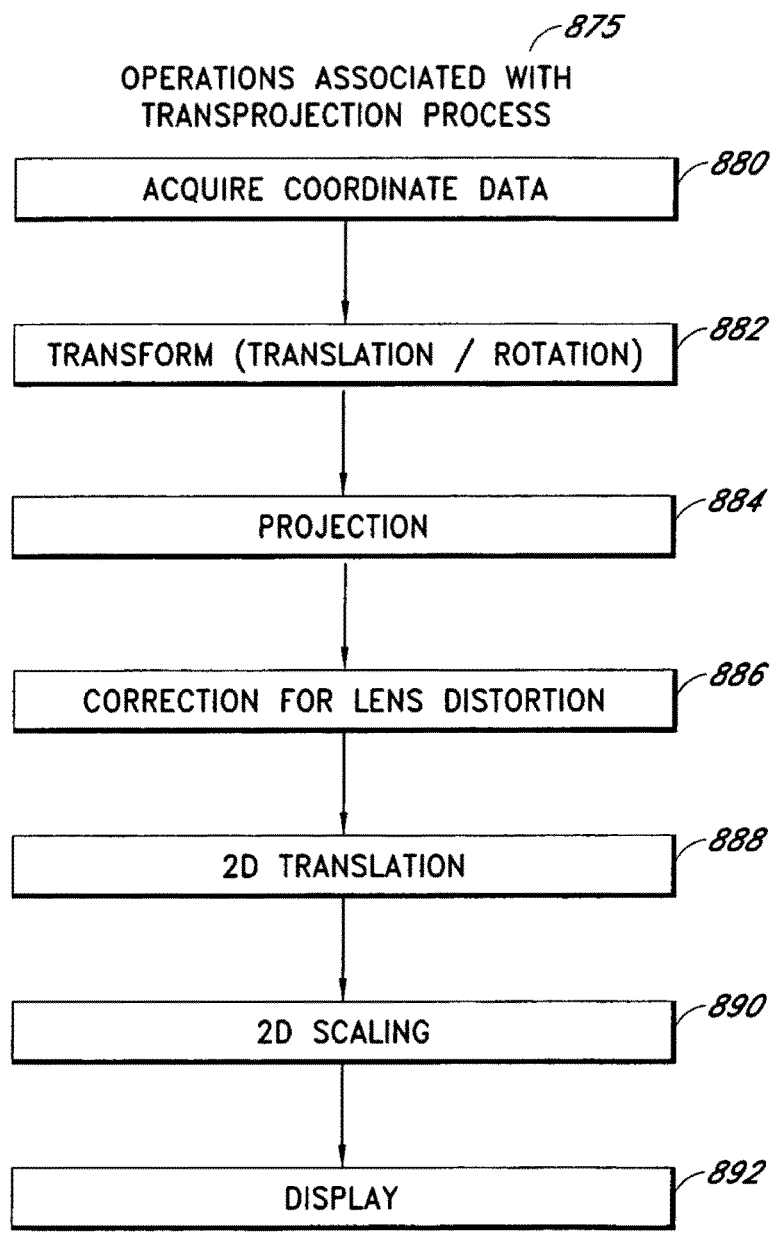
FIG. 9C illustrates an exemplary set of operations associated with the transprojection process.

FIG. 9C illustrates and exemplary set of operations 875 associated with the transprojection process. In one aspect, the transprojection process commences with the acquisition of coordinate data in state 880. The coordinate data generally obtained from a selected object within the target area may be point data or object data. As previously indicated, object data may be deconstructed into representative point data which undergoes the transprojection process and is subsequently reconstructed to reform the object data in the desired perspective, view, and/or orientation within the object image.

In state 882 a transformation operation takes the point data in its coordinate system and translates this data into the imaging member coordinate system. This may include rotation operations which align the point data with the image perspective or view. In state 884, a projection operation takes the transformed point data and places this data in the image plane of the imaging member. In one aspect, the projection operation accounts for imaging member characteristics including focal length to associate the point data with the appropriate coordinate information describing its position in the image plane.

In state 886, a lens distortion correction operation may be applied to the projected point data to more accurately reflect the true position of the point data within the image plane. Subsequently, in state 888 a 2D translation operation is applied to the point data to generate an associated 2D offset characterizing the location of the point data in the' image plane. In state 890, a 2D scaling operation scales the point data to the image effectively mapping the point data to pixels within the image. Thereafter, the resulting point data and image may be displayed wherein the point data overlays the image data in such a manner that the point data accurately reflects the object features appearing in the image data.

Figure 10:
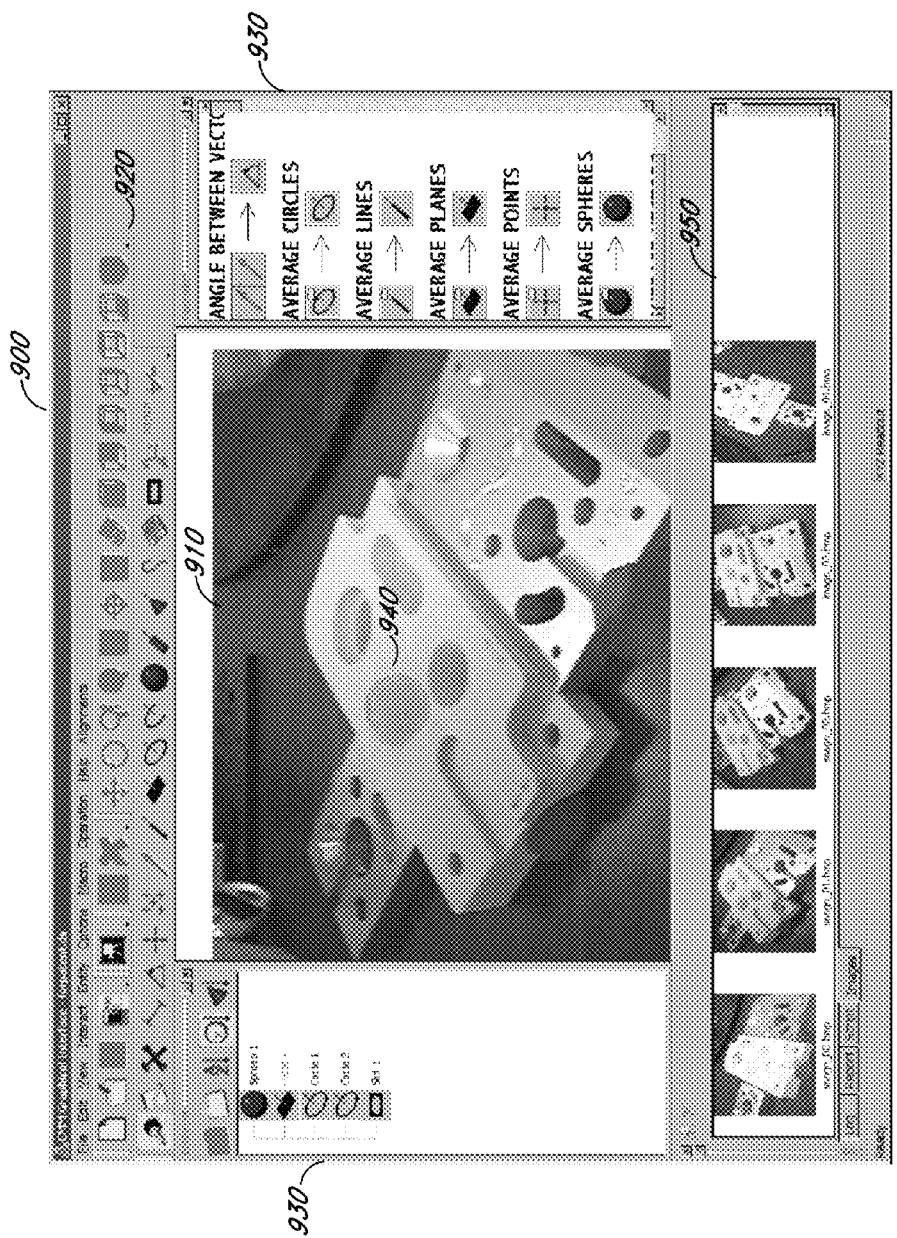
FIG. 10 illustrates an exemplary display interface associated with the transprojection system.

FIG. 10 illustrates an exemplary display interface 900 associated with the transprojection system 100. The interface 900 comprises an object view area 910 wherein an object image and associated line renderings are shown. Various tools 920 may be present within the interface 900 allowing for adjustment of the data presented in the view area 910 and may include tools for performing operations associated with: rotating, panning, zooming, cropping, selecting, measuring, and/or adjusting the data. As will be appreciated by one of skill in the art, numerous additional functionalities may be programmed into the software to provide for various manipulation and processing capabilities for the transprojected data and images. These functionalities, may further utilize the scaled geometry data, 3D coordinate data, 2D coordinate data, coordinate system information, or other information provided by or available to the system 100 to convey desired functionalities.

The function panels 930, provide exemplary functions that may be associated with manipulating and evaluating the coordinate data associated with the object image. These functionalities 930, may be directed towards utilizing the coordinate data to achieve desired results wherein the user benefits from the transprojection of the system to assess and visualize the operation of the functions. In one aspect, these function panels 930 may be utilized during coordinate data acquisition wherein the user selects various object shapes as the coordinate data is acquired. For example, the user may select for a spherical object 940 to be represented in conjunction with the object image and configure the probe 205 to be prepared to acquire the data necessary for rendering of this object type.

An object perspective view panel 950 may further be present in which the software displays some or all of the images that may have been acquired for a selected target area or object. This panel 950 provides a convenient visual reference to the user as to which views may be available for coordinate data transprojection and may be used to quickly switch between views.

Taken together the aforementioned display interface functionalities and features provide a convenient and powerful environment with which to view the transprojection data. As will be appreciated by one of skill in the art, the display interface 900 may be modified as desired to achieve other desirable functionalities and as such is not conceived to be limited to exclusively the configurations I functions illustrated.

Although the above-disclosed embodiments of the present teachings have shown, described, and pointed out the fundamental novel features of the invention as applied to the above-disclosed embodiments, it should be understood that various omissions, substitutions, and changes in the form of the detail of the devices, systems, and/or methods illustrated may be made by those skilled in the art without departing from the scope of the present invention. Consequently, the scope of the invention should not be limited to the foregoing description, but should be defined by the appended claims.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

What is claimed is:

1. A method for displaying geometry and imaging information using a coordinate measuring machine, the method comprising:
  acquiring at least one first image of at least a portion of a target area with an imaging device mounted on the coordinate measuring machine;
  mapping points of the first image to corresponding points in the target area using a touch probe mounted on the coordinate measuring machine such that the probe is movable with the imaging device; and
  processing the at least one first image and the mapped points of the first image to determine one or more calibration parameters that relates a target coordinate system associated with the target area to a first image coordinate system associated with the first image;
  wherein the one or more calibration parameters are identified by:
    designating at least one calibration target having a known positional relationship to the target area, wherein the at least one first image contains a representation of the at least one calibration target;
    applying a target detection operation to discern the representation of the at least one calibration target within the at least one first image based on at least one target characteristic selected from the group consisting of: shape, size, coloration, location, luminosity, brightness, and contrast, the at least one target characteristic being evaluated for at least one selected seed pixel of the first image and a search is performed to identify other pixels associated with the calibration target;
    associating the target's known positional relationship to the target area with the target coordinate system; and
  wherein the one or more calibration parameters can be applied to other points on an object measured using the touch probe mounted on the coordinate measuring machine, such that said points can be mapped to a second image distinct from the first image.

2. The method for displaying geometry and imaging information of claim 1, wherein the second image can have a two dimensional coordinate system and the target coordinate system is three dimensional and the at least one calibration parameter relates three dimensional points of the target coordinate system to two dimensional points of the second image coordinate system.

3. The method for displaying geometry and imaging information of claim 1, wherein the second image can have a three dimensional coordinate system and the target coordinate system is three dimensional and the at least one calibration parameter relates three dimensional points of the target coordinate system to three dimensional points of the second image coordinate system.

4. The method for displaying geometry and imaging information of claim 1, wherein the pixel identification search comprises a recursive search performed in the vicinity of the at least one selected seed pixel.

5. The method for displaying geometry and imaging information of claim 1, wherein the coordinate measuring machine is an articulated arm coordinate measuring machine and the geometry information is acquired using the probe, wherein the probe is affixed to the articulated arm coordinate measuring machine, the articulated arm coordinate measuring machine being capable of being positioned about the target area.

6. The method for displaying geometry and imaging information of claim 1, wherein the probe additionally comprises a coordinate acquisition device selected from the group consisting of: a remote-scanning probe, a laser- scanning probe, and a probe that uses an infrared beam for positioning.

7. The method for displaying geometry and imaging information of claim 1, wherein the first image is acquired using an imaging member comprising a camera capable of generating still images or video images.

8. The method for displaying geometry and imaging information of claim 1, wherein the first image is acquired using an imaging device selected from the group consisting of: X-ray imaging devices, ultrasonic imaging devices, laser imaging devices, infrared imaging devices, optical imaging devices, and digital imaging devices.

9. The method for displaying geometry and imaging information of claim 1, wherein the imaging device is mounted on the coordinate measuring machine near the probe.

10. The method for displaying geometry and imaging information of claim 1, wherein the probe comprises a coordinate acquisition device selected from the group consisting of: a contact-sensitive probe, a probe that uses a strain gauge for contact detection, a probe that uses a pressure sensor for contact detection, and a probe configured to be electrostatically-responsive.

11. A method for displaying geometry and imaging information using a coordinate measuring machine, the method comprising:
  acquiring at least one first image of at least a portion of a target area with an imaging device mounted on the coordinate measuring machine;
  mapping points of the first image to corresponding points in the target area using a probe mounted on the coordinate measuring machine such that the probe is movable with the imaging device; and
  processing the at least one first image and the mapped points of the first image to determine one or more calibration parameters that relates a target coordinate system associated with the target area to a first image coordinate system associated with the first image,
  wherein, the one or more calibration parameters are identified by:
    designating at least one calibration target having a known positional relationship to the target area, wherein the at least one first image contains a representation of the at least one calibration target;
    applying a target detection operation to discern the representation of the at least one calibration target within the at least one first image based on at least one target characteristic selected from the group consisting of:

shape, size, coloration, location, luminosity, brightness, and contrast, the at least one target characteristic being evaluated for at least one selected seed pixel of the first image and a search being performed to identify other pixels associated with the calibration target; and associating the target's known positional relationship to the target area with the target coordinate system; and wherein the one or more calibration parameters can be applied to points on an object measured using a probe mounted on the coordinate measuring machine, such that said points can be mapped to a second image distinct from the first image.

12. The method for displaying geometry and imaging information of claim 11 wherein, the pixel identification search comprises a recursive search performed in the vicinity of the at least one selected seed pixel.

13. The method for displaying geometry and imaging information of claim 11, wherein the second image can have a two dimensional coordinate system and the target coordinate system is three dimensional and the at least one calibration parameter relates three dimensional points of the target coordinate system to two dimensional points of the second image coordinate system.

14. The method for displaying geometry and imaging information of claim 11, wherein the second image can have a three dimensional coordinate system and the target coordinate system is three dimensional and the at least one calibration parameter relates three dimensional points of the target coordinate system to three dimensional points of the second image coordinate system.

15. The method for displaying geometry and imaging information of claim 11, wherein the imaging device is mounted on the coordinate measuring machine near the probe.

16. The method for displaying geometry and imaging information of claim 11, wherein the coordinate measuring machine is an articulated arm coordinate measuring machine and the geometry information is acquired using the probe, wherein the probe is affixed to the articulated arm coordinate measuring machine, the articulated arm coordinate measuring machine being capable of being positioned about the target area.

17. The method for displaying geometry and imaging information of claim 11, wherein the probe additionally comprises a coordinate acquisition device selected from the group consisting of: a remote-scanning probe, a laser- scanning probe, and a probe that uses an infrared beam for positioning.

18. The method for displaying geometry and imaging information of claim 11, wherein the first image is acquired using an imaging member comprising a camera capable of generating still images or video images.

19. The method for displaying geometry and imaging information of claim 11, wherein the first image is acquired using an imaging device selected from the group consisting of:

X-ray imaging devices, ultrasonic imaging devices, laser imaging devices, infrared imaging devices, optical imaging devices, and digital imaging devices.

* * * * *

UNITED STATES PATENT AND TRADEMARK OFFICE
CERTIFICATE OF CORRECTION

PATENT NO. : 8,792,709 B2
APPLICATION NO. : 13/529945
DATED : July 29, 2014
INVENTOR(S) : Sandeep Pulla It is certified that error appears in the above-identified patent and that said Letters Patent is hereby corrected as shown below:

In the Specification

In column 3 at line 22, Change "and," to --and--.

In column 4 at line 9, Change "2 a" to --a--.

In column 4 at line 22, Change "FIGS. 6A-1" to --FIGS. 6A-6I--.

In column 5 at line 45, Change "by, the" to --by the--.

In column 7 at line 58, Change "FIGS. 3 A-8" to --FIGS. 3A-3B--.

In column 8 at line 6, Change "computer I controller" to --computer/controller--.

In column 8 at line 41, Change "FIG. 38" to --FIG. 3B--.

In column 9 at line 30, Change "the-probe" to --the probe--.

In column 9 at line 36, Change "images.'" to --images.--.

In column 9 at line 46, Change "camera'" to --camera--.

In column 9 at lines 59-60, Change "of--transformation" to --of transformation--.

In column 14 at lines 12-13, Change "FIGS. 6 A-F." to --FIGS. 6A-F.--.

In column 14 at line 66, Change "FIG. 68." to --FIG. 6B.--.

In column 15 at lines 25-26, Change "may be provide" to --may provide--.

In column 15 at line 40, Change "FIG. 68)" to --FIG. 6B)--.

In column 15 at line 45, Change "mariner" to --manner--.

In column 16 at line 1, Change "FIGS 60-6F" to --FIGS. 6D-6F--.

In column 16 at line 44, Change "FIGS. 6G-61" to --FIGS. 6G-6I--.

In column 17 at line 3, Change "FIG. 61" to --FIG. 6I--.

In column 17 at line 15, Change "(FIG. 6G, 6H)" to --(FIGS. 6G, 6H)--.

In column 17 at lines 15-16, Change "(FIG. 61)" to --(FIG. 6I)--.

In column 23 at lines 21-22, Change "and or" to --and/or--.

Signed and Sealed this
Seventeenth Day of March, 2015

Michelle K. Lee
*Director of the United States Patent and Trademark Office*

CERTIFICATE OF CORRECTION (continued)
U.S. Pat. No. 8,792,709 B2

In column 23 at lines 23-24, Change "x1 [$x1_x$, $x1_y$, $x1_z$], y1 [$y1_x$, $y1_y$, $y1_z$], and z1 [$z1_x$,$z1_y$, $z1_z$]," to --x1 [$x1_i$, $x1_j$, $x1_k$], y1 [$y1_i$, $y1_j$, $y1_k$], and z1 [$z1_i$,$z1_j$, $z1_k$],--.

In column 23 at lines 27-28, Change "x2 [$x2_x$, $x2_y$, $x2_z$], y2 [$y2_x$, $y2_y$, $y2_z$], and z2 [$z2_x$,$z2_y$, $z2_z$]," to --x2 [$x2_i$, $x2_j$, $x2_k$], y2 [$y2_i$, $y2_j$, $y2_k$], and z2 [$z2_i$,$z2_j$, $z2_k$]--.

In column 23 at line 49 (approx.), Change "p'=o1+px1+qy1+rz1" to --p'=o1+px1+qy1+rz1.--.

In column 23 at line 56, Change "CS2" to --C2--.

In column 24 at line 3, Change "882" to --882,--.

In column 24 at line 19, Change "the'" to --the--.

In column 25 at line 2, Change "configurations I functions" to --configurations/functions--.